US009813667B1

(12) United States Patent
Patel et al.

(10) Patent No.: US 9,813,667 B1
(45) Date of Patent: Nov. 7, 2017

(54) SYSTEM AND METHOD FOR PROVIDING CO-DELIVERY OF CONTENT

(71) Applicant: Disney Enterprises, Inc., Burbank, CA (US)

(72) Inventors: Mehul Patel, Stevenson Ranch, CA (US); Christopher S. Taylor, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/134,249

(22) Filed: Apr. 20, 2016

(51) Int. Cl.
*H04N 7/14* (2006.01)

(52) U.S. Cl.
CPC .................. *H04N 7/141* (2013.01)

(58) Field of Classification Search
CPC H04N 7/15; H04N 7/152; H04N 7/14; H04N 7/142
USPC ............................................ 348/14.01–14.16
See application file for complete search history.

(56) References Cited

U.S. PATENT DOCUMENTS

| | | | | |
|---|---|---|---|---|
| 2008/0037749 | A1* | 2/2008 | Metzger | H04M 3/56 379/202.01 |
| 2010/0232626 | A1* | 9/2010 | Paquier | H04S 1/007 381/119 |
| 2011/0119392 | A1* | 5/2011 | Shamilian | H04N 21/26616 709/231 |
| 2011/0194488 | A1* | 8/2011 | Kuo | H04L 12/2809 370/328 |
| 2012/0229588 | A1* | 9/2012 | Greenfield | H04N 21/25883 348/14.04 |
| 2015/0009279 | A1* | 1/2015 | Vijayakumar | H04L 65/403 348/14.09 |
| 2016/0035311 | A1* | 2/2016 | Ryo | H04M 1/7253 455/557 |
| 2016/0073059 | A1* | 3/2016 | Bader-Natal | H04N 7/15 348/14.03 |

* cited by examiner

*Primary Examiner* — Melur Ramakrishnaiah
(74) *Attorney, Agent, or Firm* — Sheppard, Mullin, Richter & Hampton LLP

(57) ABSTRACT

Systems, devices, and methods are disclosed for providing co-deliver of primary and secondary content, including, video and video chat content. A first electronic device includes a transceiver that receives the secondary content from a second electronic device. The first electronic device also includes components capable of outputting aspects of the primary and secondary content in a synchronized fashion. Further, the first electronic device includes circuitry coupled to the transceiver and components, and the circuitry executes instructions in order to perform functions. One such function is to synchronize local primary content to be output by the components, with delivered primary content to be provided by the second electronic device. Another such function is to signal the components to output aspects of the local primary or the secondary content.

19 Claims, 10 Drawing Sheets

SYSTEM AND METHOD FOR PROVIDING CO-DELIVERY OF CONTENT

TECHNICAL FIELD

The present disclosure relates generally to interactive multimedia and connected communication. More particularly, the present disclosure is directed to systems, methods, and devices, for providing co-delivery of content, including in some examples, co-delivery of video programming content and video chat content.

BACKGROUND

Currently available platforms for connected social interaction and content delivery/consumption are limited to two-way interaction via text to complement delivered content. Such one-dimensional interactions do not allow content consumers to fully engage with one another in near-real time and thus enhance the content experience.

SUMMARY

In view of the above shortcomings in conventional interactive multimedia and connected communication platforms, there exists a need for providing co-delivery of content that includes both primary and secondary content delivered to a plurality of devices, where the primary content is synchronized across the plurality of devices. In particular, there exists a need for such platforms that enable content consumers to fully engage and interact in a way that complements the delivery of content. In this connection, embodiments of the present disclosure include systems, methods, and devices, capable of providing co-delivery of content, including, for example, using a combination of multimedia components and interfaces, as well as interconnected processors and/or circuitry, to synchronize the content across a plurality of devices.

In accordance with aspects of the present disclosure, a first electronic device provides primary content and secondary content. The first electronic device includes a transceiver that receives the secondary content from a second electronic device. The first electronic device also includes a display and an audio component, each capable of outputting aspects of the primary content and the secondary content in a synchronized fashion. Further, the first electronic device includes circuitry coupled to the transceiver, the display, and the audio component. The first electronic device additionally includes a non-transitory computer-readable medium operatively coupled to the circuitry and storing instructions that, when executed, cause the circuitry to perform a number of operations. One such operation is to synchronize local primary content to be output by one or more of the display, the audio component, a secondary display, and a secondary audio component, with delivered primary content to be provided by the second electronic device. Another such operation is to signal one or more of the display, the audio component, the secondary display, and the secondary audio component, to output aspects of one or more of the local primary content and the secondary content. The secondary display and the secondary audio component are signaled via the transceiver.

The display may be a touch-sensitive display. In such a deployment, the non-transitory computer-readable medium further stores instructions that, when executed, cause the circuitry to perform additional operations. One such operation is to, responsive to user input received via the touch-sensitive display, change a playback position of the local primary content. Another such operation is to pause the local primary content. Yet another such operation is to re-synchronize the local primary content with the delivered primary content. And another such operation is to unpause the local primary content.

In example implementations, the non-transitory computer-readable medium further stores instructions that, when executed, cause the circuitry to, responsive to an interruption in the local primary content, signal one or more of the display, the audio component, the secondary display, and the secondary audio component, to output the aspects of the local primary content at a playback position of the delivered primary content. The primary content may include pre-recorded video content, and the secondary content may include live streaming content captured by the second electronic device.

In additional example implementations, the non-transitory computer-readable medium further stores instructions that, when executed, cause the circuitry to perform additional operations. One such operation is to signal the display to output a video aspect of the local primary content in a first region of the display and a video aspect of the secondary content in a second region of the display. Another such operation is to signal the audio component to output an audio aspect of the local primary content and an audio aspect of the secondary content. In some examples, the primary content includes live programming or a pre-recorded program. In some examples, the secondary content includes live streaming content captured by the second electronic device.

In accordance with additional aspects of the present disclosure, a method for providing co-delivery of primary content and secondary content to a plurality of electronic device includes a number of operations. The method includes a first electronic device receiving the secondary content from a second electronic device. The method also includes synchronizing local primary content at the first electronic device with delivered primary content to be provided by the second electronic device. Additionally, the method includes the first electronic device causing the local primary content and the secondary content to be provided.

In example deployments, the method includes, during a time period, altering a playback speed of the local primary content. The method also includes, after the time period, pausing playback of the local primary content. And the method includes re-synchronizing the local primary content with the delivered primary content. In some instances, responsive to the playback speed of the local primary content being altered, the method includes sending a signal to indicate playback of the delivered primary content should be paused. Further, responsive to the local primary content being re-synchronized with the delivered primary content, the method includes sending a signal to indicate the playback of the delivered primary content should be unpaused, and unpausing the playback of the local primary content.

The method, in example embodiments, includes changing a playback position of the local primary content. Responsive to the playback position being changed, the method includes re-synchronizing the local primary content with the delivered primary content. Moreover, responsive to the local primary content being re-synchronized with the delivered primary content, the method includes continuing playback of the local primary content. In some cases, the method further includes, responsive to an interruption in the local primary content, the first electronic device reinitiating provision of the local primary content at a playback position of the delivered primary content.

The method may also include, responsive to an interruption in the local primary content, the first electronic device reinitiating provision of the local primary content at a last playback position that occurred in the local primary content prior to the interruption. Further, the method may include the first electronic device causing the local primary content to be provided at an increased playback speed until a playback position of the local primary content is within a predetermined range of a playback position of the delivered primary content.

Embodiments of the method disclosed herein include adjusting relative volumes of the local primary content and the secondary content, while holding an output volume of the first electronic device constant. Embodiments of the method also include altering the secondary content in order to maintain a resolution of the local primary content above a predetermined threshold. In some cases, the method includes the first electronic device sending an invitation message to the second electronic device to enable the second electronic device to receive the delivered primary content. Such cases also involve, responsive to the first electronic device receiving an acceptance message from the second electronic device, providing the second electronic device with access to the delivered primary.

In example implementations of the method, the local primary content includes one or more events. In such implementations, the method further includes the first electronic device receiving first input based on at least one of the one or more events. Additionally, the method includes associating the first input with the at least one of the one or more events. The method also includes generating a temporal profile of the local primary content. The temporal profile of the local primary content is derived from the first input for a set of the one or more events.

In example deployments of the method, the delivered primary content includes at least one of the one or more events. In such deployments, the method further includes the second electronic device receiving second input based on the at least one of the one or more events. The method also includes associating the second input with the at least one of the one or more events. Additionally, the method includes generating a temporal profile of the delivered primary content. The temporal profile of the delivered primary content is derived from the second input for a set of the one or more events. And the method includes aggregating the temporal profile of the local primary content with the temporal profile of the delivered primary content.

Further aspects of the present disclosure involve a system for co-delivery of video programming content and video chat content. The video chat content includes inbound video chat content and outbound video chat content. The system includes a host device that provides a plurality of electronic devices with access to the video programming content. The host device includes a transceiver that receives the inbound video chat content from at least one of the plurality of electronic devices and transmits the outbound video chat content to the at least one of the plurality of electronic devices. The system also includes multimedia components capable of outputting aspects of the video programming content and the video chat content. Further, the system includes circuitry coupled to the transceiver and the multimedia components. And the system includes a non-transitory computer-readable medium operatively coupled to the circuitry and storing instructions that, when executed, cause the circuitry to perform a number of operations. One such operation is to synchronize the video programming content across the host device and the at least one of the plurality of electronic devices. Another such operation is to signal the multimedia components to output the video programming content and the inbound video chat content.

In embodiments, the multimedia components include a touch-sensitive display of the host device. In such embodiments, the non-transitory computer-readable medium further stores instructions that, when executed, cause the circuitry to, responsive to input received via the touch-sensitive display, adjust relative volumes of the video programming content and the video chat content, while holding a total output volume constant.

In additional embodiments of the system, the non-transitory computer-readable medium further stores instructions that, when executed, cause the circuitry to perform additional operations. One such operation is to make a determination of whether throughput of a connection of the host device satisfies a condition. Another such operation is to, if the determination indicates that the throughput does not satisfy the condition, alter the inbound video chat content, such that a quality of service of the video programming content is maintained.

In example deployments of the system, the video programming content includes one or more events. In such deployments, the video chat content includes event-based input provided in response to at least one of the one or more events. The system also includes a server that receives the event-based input from one or more of the host device and the at least one of the plurality of electronic devices. And the system includes a processor that associates the event-based input with the at least of the one or more events, and generates a temporal profile of the video programming content. The temporal profile includes the event-based input for a set of the one or more events.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Embodiments of the present disclosure are directed to systems, methods, and devices for providing co-delivery of content, including, e.g., primary and secondary video content. In various deployments described herein, the primary and secondary video content are video programming content and video chat content, respectively, and the primary content is synchronized across a plurality of devices to which the primary and secondary content may be delivered. This synchronization, along with the complementary nature of the primary and secondary content, may enable consumers to fully engage and interact in a way that enhances the delivery/consumption of content.

The details of some example embodiments of the systems, methods, and devices of the present disclosure are set forth in this description and in some cases, in other portions of the disclosure. Other features, objects, and advantages of the disclosure will be apparent to one of skill in the art upon examination of the present disclosure, description, figures, examples, and claims. It is intended that all such additional systems, methods, devices, features, and advantages be included within this description (whether explicitly or by reference), be within the scope of the present disclosure, and be protected by one or more of the accompanying claims.

Figure 1:
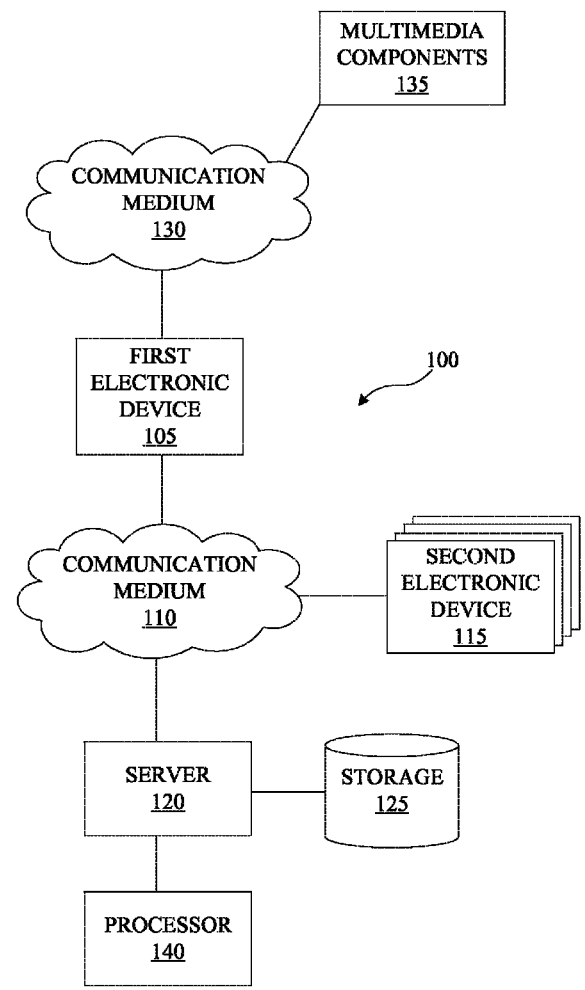
FIG. 1 illustrates an example communications environment in which embodiments of the disclosure may be implemented.

FIG. 1 depicts example communications environment 100, which may be used in connection with implementing embodiments of the disclosed systems, methods, and devices. By way of example, the various below-described components of FIG. 1 may be used to provide co-delivery of content, including, e.g., primary and complementary secondary video content, where the primary content is synchronized across a plurality of devices to which the primary and secondary content may be delivered. The primary content may be, for example, video programming content, may be pre-recorded video content, live content, and so on. The secondary content may be complementary to the primary content, and may be, by way of illustration, in-bound and/or out-bound video chat content, or live streaming content, including as captured by an electronic device. Accordingly, communications environment 100 may enable consumers to utilize personal or other electronic devices to fully engage and interact using secondary content in a way that complements and enhances the delivery/consumption of primary content.

As shown in FIG. 1, communications environment 100 may include first electronic device 105 and one or more secondary electronic devices 115. Additionally, in the illustrated embodiment, communications environment 100 includes multimedia components 135, as well as server 120 coupled to processor 140 and storage 125. First electronic device 105 is coupled to second electronic device 115 and may be coupled to server 120 via communication medium 110. In the illustrated embodiment, first electronic device 105 is coupled to multimedia components 135 via communication medium 130.

As will be described in detail herein, first electronic device 105 and second electronic device 115 may exchange secondary content via communication medium 110, and communication medium 110 may also be used to concurrently deliver (or co-deliver) primary content to/from first electronic device 105 and second electronic device 115. Such an exchange may be referred to as a co-delivery session. First and second electronic devices 105 and 115 may include a variety of electronic computing devices, such as, for example, a smartphone, tablet, laptop, wearable device, etc. Here, it will be noted that a GUI of first and/or second electronic device 105, 115 may perform such functions as accepting user input and displaying primary and secondary content. The GUI may be provided by various operating systems known in the art, such as, for example, iOS, Android, Windows Mobile. Windows, Mac OS. Chrome OS, Linux, Unix, a gaming platform OS (e.g., Xbox. PlayStation. Wii), etc. In various embodiments, communication media 110 and 130 may be based on one or more wireless communication protocols such as Bluetooth. ZigBee, 802.11 protocols, Infrared (IR), Radio Frequency (RF), 2G, 3G, 4G, etc., and/or wired protocols and media.

As mentioned, first and/or second electronic device 105, 115 may take a variety of forms, such as a desktop or laptop computer, a smartphone, a tablet, a smartwatch or other wearable electronic device, a television or other audio or visual entertainment device or system, or the like. First and second electronic devices 105 and 115 may communicate with other devices and/or with one another over communication medium 110 with or without the use of server 120. In various embodiments, first electronic device 105 and/or second electronic device 115 may be used to perform various processes described herein and/or may be used to execute various operations described herein with regard to one or more disclosed systems and methods. Upon studying the present disclosure, one of skill in the art will appreciate that communications environment 100 may include multiple electronic devices, such as first and second electronic devices 105 and 115, communication media 110 or 130, servers 120, processor 140, and/or storage 125.

As mentioned, communication medium 110 may be used to connect or communicatively couple first electronic device 105, second electronic device 115, and/or server 120 to one another or to a network, and communication medium 110 may be implemented in a variety of forms. For example, communication medium 110 may include an Internet connection, such as a local area network (LAN), a wide area network (WAN), a fiber optic network, internet over power lines, a hard-wired connection (e.g., a bus), and the like, or any other kind of network connection. Communication medium 110 may be implemented using any combination of routers, cables, modems, switches, fiber optics, wires, radio (e.g., microwave/RF links), and the like. Further, communication medium 110 may be implemented using various wireless standards, such as Bluetooth®, Wi-Fi, 3GPP standards (e.g., 2G GSM/GPRS/EDGE, 3G UMTS/CDMA2000, or 4G LTE/LTE-U), etc. Upon reading the present disclosure, one of skill in the art will recognize other ways to implement communication medium 110 for communications purposes.

Communication medium 130 may be of any of the various forms described in connection with communication medium 110, and as shown, may be used to connect or communicatively couple first electronic device to multimedia components 135. Further, although not shown in FIG. 1, a similar communication medium may be used to connect or communicatively couple second electronic device 115 to respective multimedia components. Likewise, though not shown, it will be appreciated that a similar communication medium may be used to connect or communicatively couple server, processor, and/or storage 125 to respective multimedia components and/or to one another. In example implementations, communication medium 110 may be a wired or wireless wide area network (e.g., cellular, fiber, and/or circuit-switched connection, etc.) connecting first and second electronic devices 105 and 115, which may be relatively geographically disparate; and communication medium 130 may be a wired or wireless local area network (e.g., Wi-Fi, Bluetooth, unlicensed wireless connection. USB, HDMI, standard AV, etc.), which may be relatively close geographically.

Server 120 may receive, collect, or monitor information from first and second electronic devices 105 and 115, such as input responsive to primary content and/or secondary content, and/or aspects of the primary and secondary content. In such cases, server 120 may be configured to receive such information via communication medium 110. This information may be stored in storage 125 and may be processed by processor 140. For example, processor 140 may include an analytics engine capable of performing analytics on information that server 120 has collected, received, etc. from first and second electronic devices 105 and 115. In embodiments, the server 120, storage 125, and processor 140 may be implemented as a distributed computing network, such as a Hadoop® network, or as a relational database or the like.

Server 120 may include, for example, an Internet server, a router, a desktop or laptop computer, a smartphone, a tablet, a processor, a module, or the like, and may be implemented in various forms, including, for example, an integrated circuit or collection thereof, a printed circuit board or collection thereof, or in a discrete housing/package/rack or multiple of the same. In embodiments, server 120 directs communications between first and second electronic devices 105 and 115 over communication medium 110. Such communications include the delivery and/or exchange of the primary and secondary content, and/or such communications may be related to the delivery/exchange of the primary and secondary content. For example, server 120 may process and exchange messages between first and second electronic device 105 and 115 related to synchronization, playback, or quality of service of the primary or secondary content. Server 120 may update information stored on first or second electronic device 105 or 115, for example, by delivering applications thereto. Server 120 may send/receive information to/from first and/or second electronic devices 105, 115 in real time or sporadically. Further, server 120 may implement cloud computing capabilities for first and/or second electronic devices 105, 115.

Having described some of the various elements of communications environment 100 shown in FIG. 1, an example embodiment using some of these elements will now be provided. In this non-exhaustive example, first electronic device 105 may be used to provide primary and secondary content, as follows. First electronic device 105 may request for first electronic device 105 and one or more secondary electronic devices 115 to access primary content from server 120, which in conjunction with processor 140 accesses the primary content stored in storage 125 for provision to first electronic device 105 and secondary electronic devices 115. By way of communication medium 110, first electronic device 105 synchronizes local primary content to be output by first electronic device 105 and/or multimedia components 135 with delivered primary content to be provided by second electronic devices 115. First electronic device 105 receives secondary content from one or more second electronic devices 115 via communication medium 110. First electronic device outputs video and audio aspects of the secondary content to a user, and transmits primary content to multimedia components 135 via communication medium 130. Multimedia components 135 then output audio and video aspects of the primary content to the user. Of course, many variations on this example are possible and within the scope of the present disclosure. This example may be applied in connection with various embodiments illustrated and/or described in connection with FIGS. 2A, 2B, and 2C, as well as other embodiments described herein.

Figure 2A:
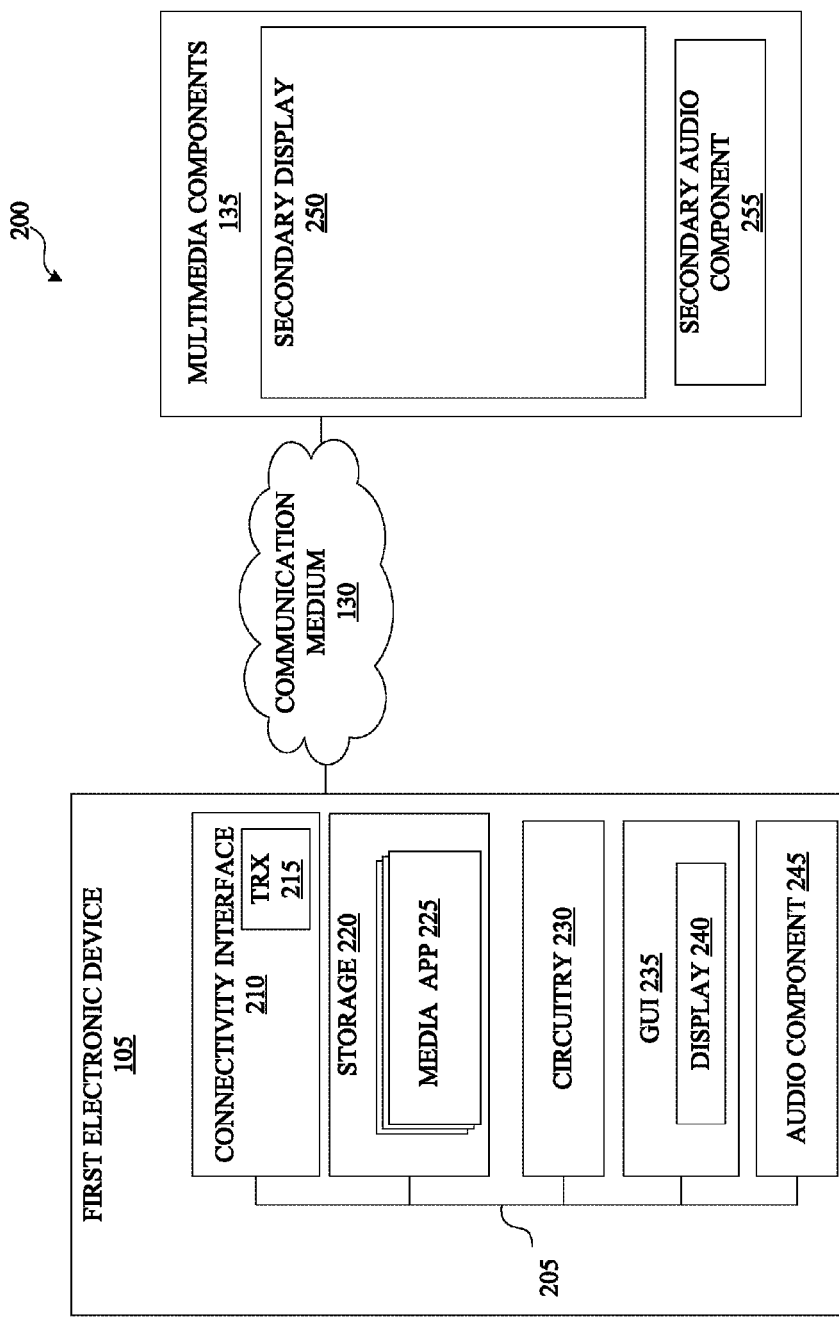
FIG. 2A illustrates another aspect of an example communications environment in which embodiments of the disclosure may be implemented.

FIG. 2A depicts example communications environment 200, which includes examples of additional aspects of the present disclosure that may be implemented in connection with example communications environment 100. As illustrated, communications environment 200 includes first electronic device 105 communicatively coupled to multimedia components 135 via communication medium 130. In the illustrated embodiment, first electronic device includes bus 205, connectivity interface 210 (which in turn includes transceiver 215), storage 220 (which in turn stores media applications 225), circuitry 230, graphical user interface (235), which may be presented using display 240 of first electronic device 105, and audio component 245. As shown, bus 205 may be used to interconnect the various elements of first electronic device 105 and transfer data between these elements. First electronic device 105 may be used for providing primary and secondary content.

With continued reference to FIG. 2A, connectivity interface 210 interfaces first electronic device 105 to communication medium 130, such that first electronic device 105 may be communicatively coupled to multimedia components 135 via communication medium 130. Transceiver 215 of connectivity interface 210 may include multiple transceiver modules operable on different wireless standards. Transceiver 215 may be used to receive secondary content from second electronic devices 115. Additionally, connectivity interface 210 may include additional components for controlling radio and/or wired connections, such as baseband and/or Ethernet modems, audio/video codecs, and so on.

Storage 220 may include volatile memory (e.g. RAM) and/or non-volatile memory (e.g. flash storage), may include any of EPROM, EEPROM, cache, or may include some combination/variation thereof. In various embodiments, storage 220 may store user input data and/or other data collected by first electronic device 105 (e.g., input from other users gathered via secondary content). Storage 220 may also be used to store downloaded content (e.g., movies, books, and so on) for later retrieval and use, e.g., as primary content. Additionally, storage 220 may store tracking application media applications 225 that, when executed using processor aspects of circuitry 230, for example, receives input (e.g., by a conventional hard/soft key or a touch screen, voice detection, or other input mechanism), and allows a user to interact with the primary and/or secondary content, as will be described in further detail herein.

In various embodiments, a user may interact with media application 225 via GUI 235, which may be provided by display 240 of first electronic device 105. By way of example, display 240 may be a touchscreen display that accepts various hand gestures as inputs. Media application 225 may process and/or present content-related data received by first electronic device 105, according to various operations described herein, and present such data via display 240. Additionally, media application 225 may be used to obtain, access, display, control, and/or interface with primary and secondary content, as is described in further detail herein.

Media application 225 may be downloaded, installed, and initially configured/setup on first electronic device 105. For example, first electronic device 105 may obtain media application 225 from server 120, or from another source accessed via a communication medium (e.g., communication medium 110), such as an application store or the like. Following installation and setup, media application 225 may be used to access primary content (e.g., from server 120, locally from storage 220, or from multimedia components 135). By way of illustration, media application 225 may present a menu that includes the various primary content files available to user (locally, streaming, etc.). Media application 225 may also be used to interface with other electronic devices, for example, to deliver or make available thereto primary content, to receive/send secondary content, etc., as will be described herein.

Media application 225 may include various code/functional modules, such as, for example, a display module, a chat module, primary content module, a multimedia module. These modules may be implemented separately or in combination. Each module may include computer-readable media and have computer-executable code stored thereon, such that the code may be operatively coupled to and/or executed by circuitry 230 (which, e.g., may include a processor) to perform specific functions (e.g., as described herein with regard to various operations and flow charts etc.) with respect to interfacing with primary and secondary content and performing tasks related thereto. As will be further described below, a display module may present (e.g., via display 240) various screens to a user, with the screens containing graphical representations of information provided by media application 225. In further embodiments, media application 225 may be used to display to the user an environment for viewing and interacting with primary and/or secondary content, including controlling multimedia components 135, display 240, and audio component 245. Media application 225 may include a native application modified with a software design kit (e.g., depending on the operating system) in order to carry out the functionalities/features described herein.

Referring again to FIG. 2A, first electronic device 105 also includes circuitry 230. Circuitry 230 may include a processor or processor modules, including, by way of example, an applications processor that interfaces with and/or controls other elements of first electronic device 105 (e.g., connectivity interface 210, media app 225, GUI 235, display 240, audio component 245, and bus 205). Circuitry 230 may include a controller that provides various controls (e.g., interfaces with buttons and switches) related to media playback, such as, for example, volume adjustment, track skipping, audio or video track pausing, and the like, and interfaces with drivers of various audio/visual components described herein. Additionally, the controller may include various controls related to the gathering of user input, such as, for example, a user's finger print (e.g., to authorize the user's access to particular content or chat groups).

Circuitry 230 may include processors (including, in some instances, logic circuits), memory, a battery and power circuitry, and other circuitry drivers for periphery components and audio component 245. Circuitry 230 and any processors thereof may include logic circuits for receiving, processing, and/or storing content received and/or data input to first electronic device 105, and content to be transmitted or delivered by first electronic device 105. More particularly, as shown in FIG. 2A, circuitry 230 may be coupled by bus 205 to display 240 as well as connectivity interface 210 and storage 220 (including media application 225). Hence, circuitry 230 may receive and process electrical signals generated by these respective elements and thus perform various functions. By way of example, circuitry 230 may access stored content from storage 220 at the direction of media application 225, and process the stored content for display and/or output by display 240 and/or audio component 245. Additionally, circuitry 230 may process the stored content for transmission via connectivity interface 210 and communication medium 130 to multimedia components 135 or communication medium 110 to second electronic devices 115 or server 120. Circuitry 230 may include other peripheral components not shown in detail in FIG. 2A. For example, circuitry 230 may include camera lenses and modules, including flashes to be operation in connection therewith, that may be used to capture secondary content, as will be described herein, motion or light sensors, infrared input/outputs, and so on.

In further embodiments, logic circuits of circuitry 230 may further detect, calculate, and/or store data input by a user via display 240 or other input mechanisms of first electronic device 105, such as the user's input provided in response to the primary or secondary content, over a period of time. The logic circuits may use this input to gauge the user's response to the content and/or other factors (e.g., users participating in chat session, time of day, location, etc.). In various embodiments, the user's response may indicate the user's preferences with respect to the content, other users in a chat session, and other factors, and may be used to create a temporal profile, as will be described in further detail herein.

As shown in the illustrated embodiment of first electronic device 105, bus 205 may also be coupled to audio component 245. Audio component 245 may include speakers, microphones, headphone or other jacks or other audio input/output interfaces and the like, including drivers for these components (e.g., moving coil drivers, electrostatic drivers, electret drivers, orthodynamic drivers, and other transducer technologies may be used). Circuitry 230 may be configured to output video aspects of content via display 240 while outputting audio aspects of the content via audio component 245. Audio component 245 may also be used to capture secondary content, as will be described herein. Circuitry 230 may also interface with video input/output mechanisms such as HDMI, USB, and the like.

With continued reference to FIG. 2A, as mentioned above, communications environment 200 also includes multimedia components 135 communicatively coupled to first electronic device 105 via communication medium 130. For example, this coupling may be accomplished using transceiver 215 (which may be a transceiver for wireless or wired communications), which may be configured to transmit/receive content-related data (e.g., video, audio, and/or other data) across communication medium 130, for example using available wireless/wired communications protocols/standards or methods.

In some embodiments, transceiver 215 may utilize BLUETOOTH, ZIGBEE. Wi-Fi. GPS, cellular technology, or some combination thereof. Further, although FIG. 2A illustrates a single transceiver 215 for transmitting/receiving content-related and other data, separate transceivers may be dedicated for communicating particular types of date or for doing so in particular fashions. In some cases, transceiver 215 may include a low energy transmitter/receiver such as a near field communications (NFC) transmitter/receiver or a BLUETOOTH low energy (LE) transmitter/receiver. In further example implementations, separate wireless transceivers may be provided for receiving/transmitting high fidelity audio and/or video data. In yet additional embodiments, a wired interface (e.g., micro-USB, HDMI, etc.) may be used for communicating data between first electronic device 105 and second electronic device 115 and/or multimedia components 135. As shown, multimedia components 135 include one or more of secondary display 250 and secondary audio component 255. In general terms, secondary display 250 and secondary audio component 255 may be similar to display 240 and audio component 245. In some example implementations, first electronic device 105 is a portable device (e.g., a smartphone or tablet) and multimedia components 135 are stationary in nature. In additional implementations, multimedia components 135 or at least components thereof are mobile in nature.

For example, first electronic device 105 may be a smart phone coupled to a television that includes multimedia components 135 (e.g., television display screen being secondary display 250 and television speakers being secondary audio component 255). In this example, secondary display 250 may be used to display video aspects of content delivered from first electronic device 105 to multimedia components 135 via communication medium 130, and secondary audio component 255 may be used to output audio aspects of that content. In other examples, secondary audio components 255 may be separate from secondary display 250 (e.g., may be part of a home theatre system). Additionally, secondary display 250 is not limited to a television screen, but may be any type of display, including a projector, computer or tablet screen, movie theatre screen, or any other type of display.

In additional embodiments, multimedia components 135 include components that may be used to gather secondary content to be delivered by first electronic device 105. By way of illustration, multimedia components 135 may include microphones and cameras to gather audio and visual content that may transmitted to first electronic device via communication medium 130. As will be described herein, such gathered content may be shared with other electronic devices and used in chat sessions.

Having described examples of various hardware elements of first electronic device 105 and multimedia components 135, the delivery, handling, and provision of primary and secondary content, including in some examples using these hardware elements, will now be described with reference to FIGS. 2B and 2C.

Figure 2B:
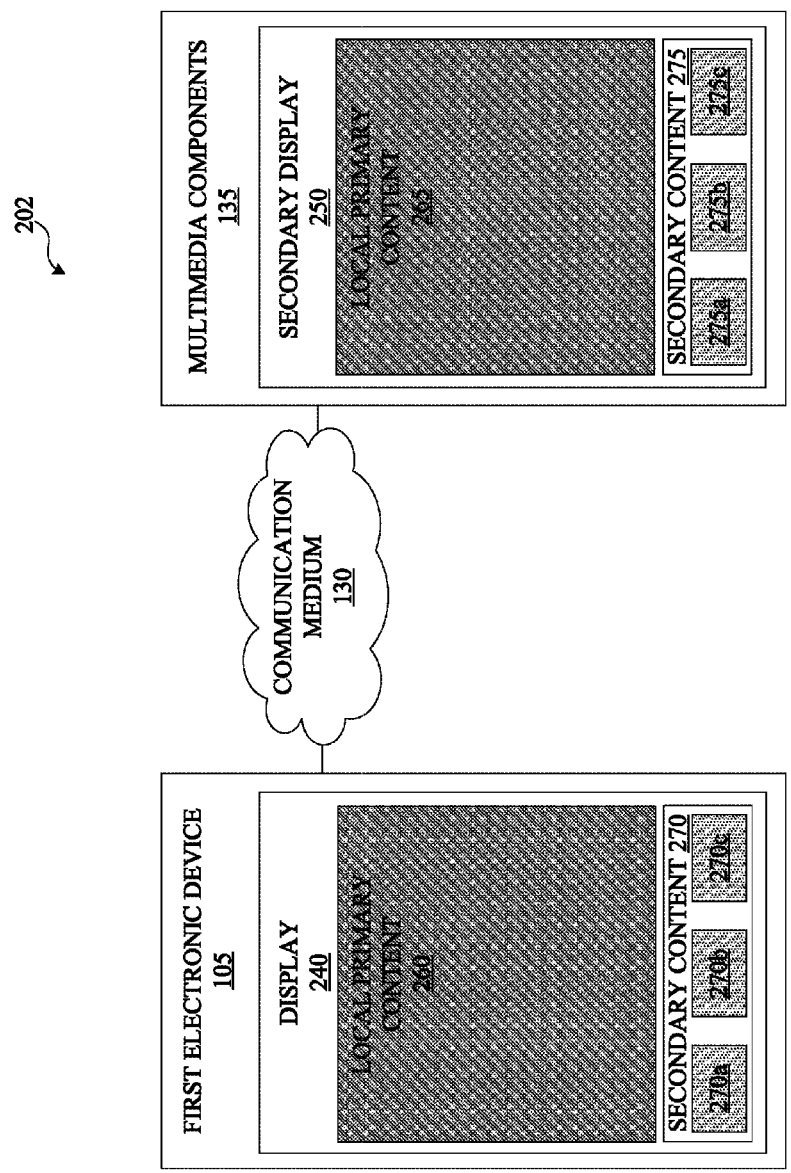
FIG. 2B illustrates another aspect of an example communications environment in which embodiments of the disclosure may be implemented.

FIG. 2B depicts example communications environment 202, which includes examples of additional aspects of the present disclosure that may be implemented in connection with example communications environment 100. In embodiments illustrated by FIG. 2B, communications environment 202 includes first electronic device 105 communicatively coupled to multimedia components 135 via communication medium 130. In particular, communications environment 202 illustrates a foundation providing various options for expanding or varying the display of primary content and secondary content as between first electronic device 105 and multimedia components 135. When first electronic device 105 is communicatively coupled to multimedia components 135 via communication medium 130, the primary and secondary content may be adjustably distributed among display 240 and secondary display 250 to accommodate a range of user preferences. Audio aspects of the primary and secondary content may likewise be distributed among first electronic device 105 (e.g., audio components 245) and multimedia components 135 (e.g., secondary audio component 255).

First electronic device 105 includes display 240, and multimedia components 135 include secondary display 250. As shown, in various embodiments, display 240 and secondary display 250 are partitioned for the display of primary content and secondary content. As mentioned above, one example of primary content is video programming content. By way of illustration, such video programming content may be a movie streamed to first electronic device 105 (e.g., by server 120 via communication medium 110, with reference to FIG. 1). The video programming content may also include a television series, video clip, event recorded/broadcast in real-time, and so on.

In one example implementation, first electronic device 105 displays local primary content 260 in a larger portion of display 240 located at the upper portion thereof, and displays secondary content 270 in a smaller portion of display 240 located at the lower portion thereof. In this regard, storage 220 of first electronic device 105 may include a non-transitory computer readable medium operatively coupled to circuitry 230 and storing instructions thereon that, when executed, cause circuitry 230 to signal display 240 to output a video aspect of local primary content 260 in a first region of display 240 and a video aspect of secondary content 270 in a second region of display 240, including in some cases interfacing with media application 225 and/or drivers of display 240 and/or multimedia components 135. Further, storage 220 of first electronic device 105 may include a non-transitory computer readable medium operatively coupled to circuitry 230 and storing instructions thereon that, when executed, cause circuitry 230 to signal audio component 245 to output an audio aspect of local primary content 260 and an audio aspect of secondary content 270, including in some cases interfacing with media application 225 and/or drivers of audio component 245 and/or multimedia components 135.

Further, in this implementation, secondary content 270 includes three elements: secondary content 270*a*. 270*b*, and 270*c*. By way of example, each of these three elements may represent secondary content from a particular user. For example, secondary content 270*a* may be captured in connection with a first user of first electronic device 105, and secondary content 270*b* and 270*c* may be captured in connection with second and third users of secondary electronic devices 115. As mentioned above, secondary content may include video chat content, and may be inbound video chat content (e.g., received from second electronic devices 115) or outbound video chat content (e.g., captured by first electronic device for transmission to second electronic devices 115). In other words, in such examples, each element of secondary content 270*a*, 270*b*, and 270*c* may be video/audio of a user captured by an electronic device (e.g., first or second electronic devices 105, 115).

A similar arrangement may be implemented at secondary display 250 to include local primary content 265 and secondary content 275 with its elements: secondary content 275*a*, 275*b*, and 275*c*. First electronic device 105 and multimedia components 135 may signal one another using communication medium 130 in order to synchronize the display of any common content. For example, while display 240 is displaying local primary content 260 and transmitting the same to multimedia components 135 for display on secondary display 250, first electronic device 105 may exchange synchronization messaging with multimedia components 135 in order to time synchronize the playback of local primary content 260 with local primary content 265. This concept may be applied to secondary content 270 and 275 as well.

Although a particular arrangement of local primary content 260 and secondary content 270 is illustrated on displays 240 and 250, many other arrangements are possible within the scope of the present disclosure. For example, local primary content 260 may be made smaller in proportion to secondary content 270 and may be placed on other areas of display 240. Additionally, local primary content 260 and secondary content 270 may be arranged so as to allow a user to interface with other applications and/or GUI elements (e.g., of media application 225 or otherwise) while local primary content 260 and secondary content 270 are being displayed. Likewise, although a particular arrangement of local primary content 265 is illustrated on secondary display 250, many other arrangements are possible within the scope of the present disclosure. In embodiments of the present disclosure, the arrangement of primary and secondary content is configured automatically (e.g., using settings in media application 225), on the fly in response to operating conditions, or in response to user input, including, for example, user input received in real-time via display 240 or other input mechanisms or first electronic device 105 and/or multimedia components 135 (e.g., inputs received via remote mechanisms).

Additionally, in some instances, local primary content 260 and/or secondary content 270 may not be included on display 240. In one such instance, first electronic device 105 transmits the local primary content to multimedia components 135 via communication medium 130. At multimedia components 135, the local primary content is then displayed on secondary display 250 as local primary content 265. In this instance, with the local primary content being displayed by secondary display 250 as local primary content 265, secondary content 270 can be expanded on display 240, for example, to be enlarged, to accommodate additional users, etc. Alternatively, the relative size of secondary content 270 may be maintained, but additional applications and/or GUI elements (e.g., of media application 225 or other applications) may be displayed in lieu of local primary content 260. In another instance, and in some cases a similar fashion, first electronic device 105 transmits the secondary content to multimedia components 135 where the secondary content may be displayed on secondary display 250 as secondary content 275, with its elements secondary content 275a, 275b, and/or 275c.

Alternatively, both the local primary content and the secondary content may be sent to and output by multimedia components 135. As a further example of a variation, only the audio aspect of the primary content or the secondary content may be sent to and output by multimedia components 135 (e.g., by secondary audio component 255). Additionally, in some cases, less than all the elements of the secondary content are sent to multimedia components 135 for output thereby.

Figure 2C:
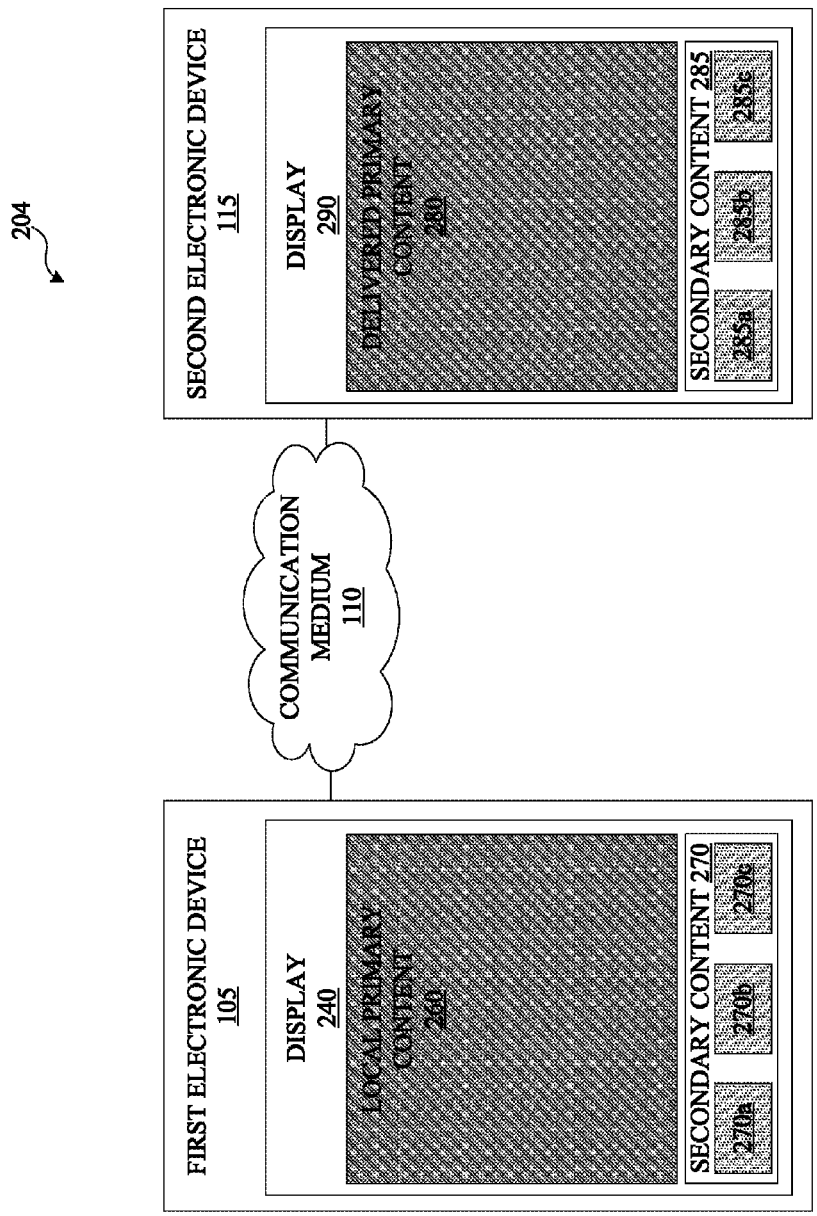
FIG. 2C illustrates another aspect of an example communications environment in which embodiments of the disclosure may be implemented.

FIG. 2C depicts example communications environment 204, which includes examples of additional aspects of the present disclosure that may be implemented in connection with example communications environment 100. In embodiments illustrated by FIG. 2C, communications environment 204 includes first electronic device 105 coupled via communication medium 110 to second electronic device 115. Specifically, communications environment 204 may illustrate a foundation for providing various examples of exchanging primary and secondary content between first and second electronic devices 105 and 115.

As shown in FIG. 2C, one embodiment of first electronic device 105 includes display 240 that in turn includes local primary content 260 and secondary content 270. Secondary content 270, in this embodiment, includes elements of secondary content 270a. 270b, and 270c. In a similar fashion, the illustrated embodiment of second electronic device 115 includes display 290 that in turn includes delivered primary content 280 and secondary content 295, which includes elements of secondary content 285a. 285b, and 285c. Delivered primary content 280 may be primary content delivered to second electronic device 115 by first electronic device 105 via communication medium 110. Alternatively, delivered primary content 280 may be delivered to second electronic device by server 120 via communication medium 110.

As described herein, circuitry 230 of first electronic device 105 may synchronize local primary content 260 displayed by display 240 (and/or secondary display 250) with delivered primary content 280 displayed by display 290. This may involve, for example, the exchange of synchronization messages between first and second electronic device 105 and 115 via communication medium 110. In other embodiments, synchronization may be done through first and second electronic devices 105 and 115 exchanging such messages with server 120 via communication medium 110. In addition to video aspects of local primary content 260 and delivered primary content 280 being synchronized thusly, audio aspects of local primary content 260 and delivered primary content 280 may also be synchronized in a similar fashion. Synchronization in this manner can enable a first user receiving local primary content 260 and a second user receiving delivered primary content 280 to view/listen to the same content at essentially the same time, and thus have a more meaningful interaction (e.g., with respect to the primary content) via secondary content 270 and 285.

In example implementations of communications environment 204, there may be various forms of interplay between the primary and secondary content. To illustrate, aspects of local primary content 260 may bleed over to secondary content 270 and vice versa. In particular deployments, for example, secondary content 270 may include messages (e.g., text, icons, or images), and additionally in some cases streaming video, input by users in response to primary content or otherwise received/captured by second electronic device 115, and such messages may extend into and overlap local primary content 260. To illustrate, a user of second electronic device 115 viewing delivered primary content 280 may respond thereto with input to secondary electronic device 115. This input may take the form of a gesture, use of soft/hard keys, voice, etc. In one deployment, the user may select an emoticon in response to a particular event or scene occurring in delivered primary content 280. Emoticons may be advantageous because they are more streamlined than text communications, and thus tend to provide less distraction from the primary content. The emoticon may then be delivered to first electronic device 105 (and/or other second electronic devices 115) in the form of secondary content 270a (or 285a for other second electronic devices 115), and the emoticon may be displayed on display 240 to a user of first electronic device 105. In embodiments, the user of secondary electronic device 115 may assign input to be delivered to a subset of users participating in a session. Such input, including emoticons may overlay inbound video chat received from second electronic devices 115.

Additional methods of providing input are also contemplated in the present disclosure. For example, a user of second electronic device 115 may, in response to a scene or event occurring in delivered primary content 280, provide gesture-based input directly over a portion of delivered primary content 280 (e.g., by drawing a colored line or other object with the user's finger) and/or secondary content 285a. 285b, and/or 285c. The user may then drag this input to other users (e.g., by dragging the input to secondary content 285a, 285b, and/or 285c) in order to send the input to such users. Subsequently, the input may be delivered to first electronic device 105 and/or other second electronic devices 115 of the users, and may appear in a corresponding position in local primary content 260 (of a user of first electronic device 105) and/or delivered primary content 280 (of other user(s) of second electronic devices 115), or may appear in a corresponding position in secondary content 270 or 285. Another technique for delivering user input on an assigned basis may include providing a pop-up menu whereby the user may select recipients from a list; or the user may select the recipients by selecting (e.g., tapping) the corresponding secondary content 285a, 285b, and/or 285c. If as mentioned above, the user input is provided directly over secondary content 285a. 285b, and/or 285c, this may serve as an assignment mechanism to provide the input only to the electronic device (e.g., first and/or second electronic device 105, 115) of the corresponding user.

FIGS. 3, 4A, 4B, 5A, and 5B illustrate flow charts depicting various operations of methods 300, 400, 402, and 500, respectively, and accompanying embodiments for providing co-delivery of primary and secondary content, in accordance with aspects of the present disclosure. Generally, methods 300, 400, 402, and 500 provide co-delivery of primary and secondary content, including among a plurality of electronic devices in a synchronized fashion, and including, by way of example, where such primary content includes video programming content and such secondary content includes video chat content. The operations of the various methods described herein are not necessarily limited to the order described or shown in the figures, and one of skill in the art will appreciate, upon studying the present disclosure, variations of the order of the operations described herein that are within the spirit and scope of the disclosure.

The operations and sub-operations of methods 300, 400, 402, and 500 may be carried out, in some cases, by one or more of the components, elements, devices, modules, and circuitry of communications environments 100, 200, 202, and 204, first and second electronic devices 105 and 115, media application 225, circuitry 230, connectivity interface 210, and computing module 600, described herein and referenced in FIGS. 1, 2A-2C, and 6, as well as sub-components, elements, devices, modules, and circuitry depicted therein and/or described with respect thereto. In such instances, the description of methods 300, 400, 402, and/or 500 may refer to a corresponding component, element, etc., but regardless of whether an explicit reference is made, one of skill in the art will recognize when the corresponding component, element, etc. may be used. Further, it will be appreciated that such references do not necessarily limit the described methods to the particular component, element, etc. referred to. Thus, it will be appreciated by one of skill in the art that aspects and features described above in connection with (sub-) components, elements, devices, modules, and circuitry, etc., including variations thereof, may be applied to the various operations described in connection with methods 300, 400, 402, and/or 500 without departing from the scope of the present disclosure.

Figure 3:
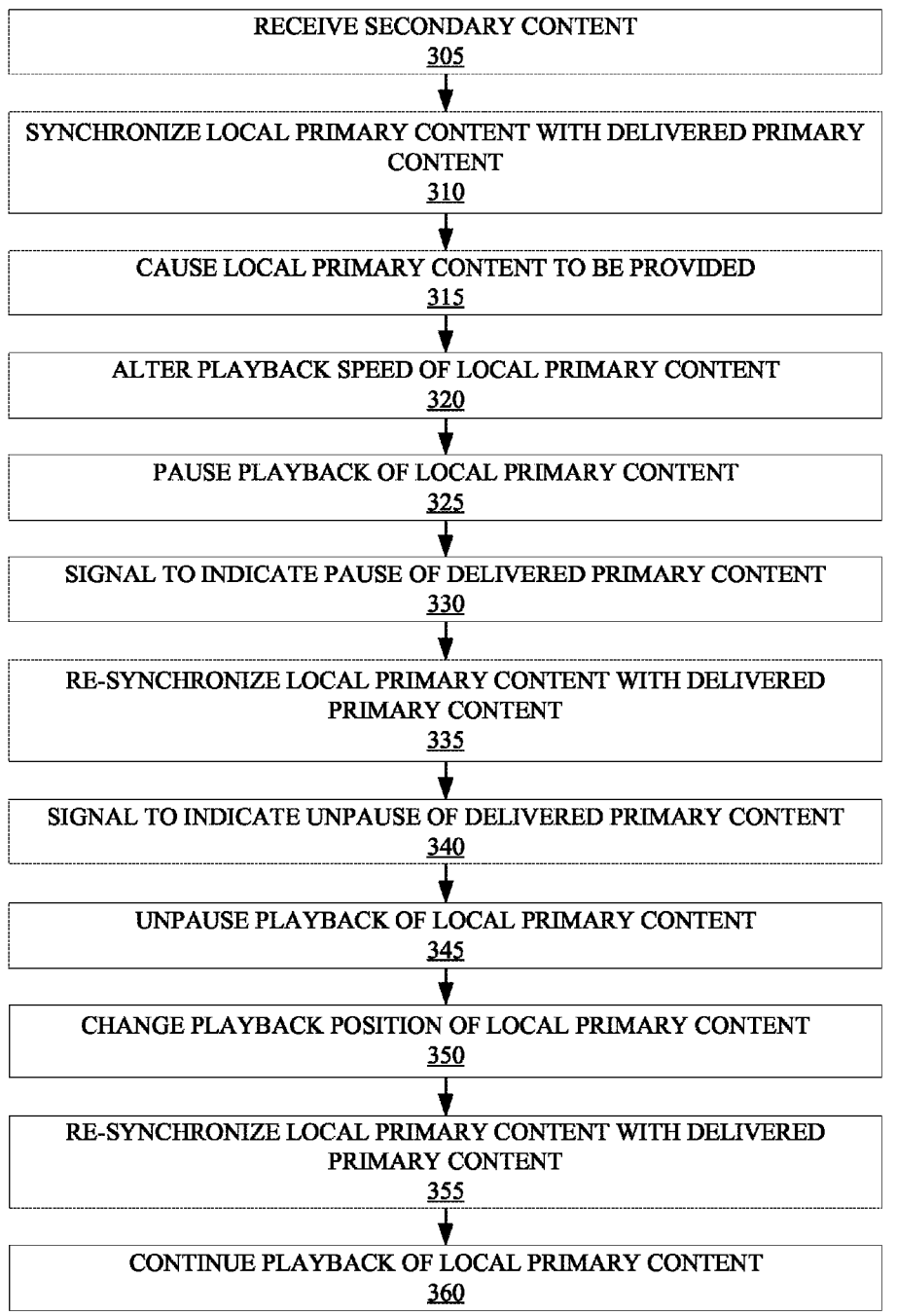
FIG. 3 is an operational flow diagram illustrating various operations that may be performed in accordance with embodiments of the disclosure.

Referring now to FIG. 3, at operation 305, method 300 entails a first electronic device (e.g., first electronic device 105) receiving secondary content (e.g., secondary content 270 or a sub-element thereof) from a second electronic device (e.g., second electronic device 115). For example, the secondary content may be received via communication medium 110 and/or using transceiver 215. In embodiments, the secondary content includes video and/or audio chat content captured by second electronic device 115. The secondary content may also include text, icons (e.g., emoticons), user-generated input, images, and any other content, accompanying video/audio chat content. In some instances, operation 305 is facilitated or controlled by circuitry 230 and/or media application 225. For example, storage 220 may include a non-transitory computer readable medium operatively coupled to circuitry 230 and storing instructions thereon that, when executed, cause circuitry 230 to receive secondary content (e.g., secondary content 270 or a sub-element thereof) from a second electronic device, including in some cases interfacing with connectivity interface 210 to do so.

At operation 310, method 300 involves synchronizing local primary content (e.g., local primary content 260 at first electronic device 105 or local primary content 265 at multimedia components 135) with delivered primary content (e.g., delivered primary content 280) to be provided by the second electronic device. As described above, this may involve first electronic device 105 and second electronic device 115 exchanging synchronization messaging over communication medium 110. Synchronization may occur at the outset of the primary content being provided, and may also be done periodically and/or on an event-driven basis while the primary content is being provided.

In some instances, operation 310 is facilitated or controlled by circuitry 230 and/or media application 225. For example, storage 220 may include a non-transitory computer readable medium operatively coupled to circuitry 230 and storing instructions thereon that, when executed, cause circuitry 230 to synchronize local primary content (e.g., local primary content 260 or 265) with delivered primary content, including in some cases interfacing with connectivity interface 210 to exchange synchronization messaging with second electronic device 115.

Method 300 also includes, at operation 315, the first electronic device causing the local primary content and the secondary content to be provided (e.g., via display 240, audio component 245, and/or multimedia components 135). In some cases, operation 315 is facilitated or controlled by circuitry 230 and/or media application 225. For example, storage 220 may include a non-transitory computer readable medium operatively coupled to circuitry 230 and storing instructions thereon that, when executed, cause circuitry 230 to cause the local primary content and the secondary content to be provided, including in some cases interfacing with connectivity interface 210 to exchange the local primary content with multimedia components 135 (e.g., via signaling over communication medium 130) or interfacing with display 240 and/or audio component 245 for those components to provide the local primary content (e.g., via signaling over bus 205). In this regard, circuitry 230 may initiate signaling with one or more of display 240, audio component 245, and multimedia components 135 (which may include secondary display 250 and/or secondary audio components) such that the signaling causes aspects of the local primary content and/or the secondary content to be output.

Operations 320 through 340 may be included in embodiments of method 300 and generally relate to altering the playback speed of local primary content and the resultant interaction and coordination with delivered primary content. For example, at a high level, upon a playback speed of the local primary content being altered, the playback of the delivered primary content may be paused until such time as the playback speed of the local primary content is returned to normal.

At operation 320, method 300 may include altering a playback speed of the local primary content. The playback speed may be altered during a time period. By way of example, the playback speed of the local primary content may be increased to 1.5× of normal (e.g., equivalent to a fast-forward function) for a period of 30 seconds. The time period may be programmable or preconfigured, or may be determined dynamically based on the nature of user input that may be used to initiate the alteration. The playback speed may also be altered to be less the 1× of normal speed (e.g., equivalent to slow motion), and may be altered to be a negative playback speed of less than, equal to, or greater than 1× of normal speed (e.g., equivalent to a rewind function). Operation 320 may be facilitated by GUI 235 and media application 225. To illustrate, a user may provide input to first electronic device 105 using gestures made on display 240 to interact with soft keys, buttons, icons, or images, to initiate the alteration of the playback speed of the local primary content. Furthermore, in some instances, operation 320 is facilitated or controlled by circuitry 230 and/or media application 225. For example, storage 220 may include a non-transitory computer readable medium operatively coupled to circuitry 230 and storing instructions thereon that, when executed, cause circuitry 230 to alter a playback speed of the local primary content, including in some cases interfacing with media application 225 and/or drivers of display 240, audio component 245, and/or multimedia components 135. The playback alteration may also be controlled via remote control devices and the like.

At operation 325, method 300 may involve pausing the playback of the local primary content after the occurrence of the time period during which the playback speed is altered. In embodiments, this occurs automatically upon expiration of the time period or is based on prompted or unprompted user input to the instructing the pause to occur. At operation 330, method 300 may involve sending a signal to indicate playback of the delivered primary content should be paused. For example, first electronic device 105 may send such a signal to second electronic device 115 (e.g., using transceiver 215) responsive to the playback speed of local primary content 260 being altered (e.g., per operation 320 or otherwise). In example implementations, an indication may be provided on second electronic device 115 to indicate that the playback of the delivered primary content has been paused (including. e.g., due to the playback speed of local primary content being altered). For example, a graphic may be displayed to indicate the delivered primary content is loading or refreshing. It should be noted here that operation 330 may occur before or after operation 325. In alternative embodiments, instead of the delivered primary content being paused, the playback speed of the delivered primary content may be altered in a fashion similar to that of the local primary content.

In some instances, operation 325 and/or 330 is facilitated or controlled by circuitry 230 and/or media application 225. For example, storage 220 may include a non-transitory computer readable medium operatively coupled to circuitry 230 and storing instructions thereon that, when executed, cause circuitry 230 to pause the playback of the local primary content after the occurrence of the time period during which the playback speed is altered, including in some cases interfacing with media application 225 and/or drivers of display 240, audio component 245, and/or multimedia components 135. Further, storage 220 may include a non-transitory computer readable medium operatively coupled to circuitry 230 and storing instructions thereon that, when executed, cause circuitry 230 to send a signal to indicate playback of the delivered primary content should be paused, including in some cases interfacing with media application 225 and/or connectivity interface 210.

At operation 335, method 300 may include re-synchronizing the local primary content with the delivered primary content. This may be done in a fashion substantially similar to the synchronization process described herein (e.g., in connection with operation 310), including in terms of facilitation and/or control by circuitry 230 and/or media application 225. At operation 340, method 300 may include sending a signal to indicate the playback of the delivered primary content should be unpaused. This may be done in a similar fashion to operation 330, including in terms of facilitation and/or control by circuitry 230 and/or media application 225. Method 300 may further include, at operation 345, unpausing the playback of the delivered primary content. With respect to operations 340 and 345, the signal may be sent (and the playback unpaused) responsive to the local primary content being resynchronized with the delivered primary content (e.g., at operation 335). For example, first electronic device 105 may send such a signal to second electronic device 115 (e.g., using transceiver 215) responsive to synchronization messaging indicating that the local and delivered primary content have been resynchronized. Operation 340 may be accomplished in a substantially similar manner as operation 325 in terms of facilitation and/or control by circuitry 230 and/or media application 225. After resynchronization, the local and delivered primary content may be paused, and first electronic device 105 may then provide an option for resuming playback (i.e., unpausing the primary content).

With continued reference to FIG. 3, operations 350 through 360 generally relate to changing a playback position of local of local primary content and the resultant interaction and coordination with delivered primary content. By way of example, at a high level, responsive to the playback position of the local primary content being changed, the local primary content is re-synchronized with the delivered primary content, and then playback of the local primary content is continued at the new playback position.

At operation 350, method 300 entails changing a playback position of the local primary content (e.g., local primary content 260). This may be done in a number of ways. For example, GUI 235 may present an interactive image indicating the playback position of the local primary content, and a user may interact with the image (e.g., where display 240 is touch-sensitive) to change the playback position backwards or forwards. The image may resemble a slide bar with the position being indicated by shape or other icon that traverses the slide bar during playback. The playback position may also be changed using chapter advance/reverse keys (hard or soft keys) to shuffle between chapters or tracks in content. Changing the playback position of the local primary content may involve circuitry 230 initiating signaling to storage 220 or an external storage device (e.g., external hard drive. Blu-ray, DVD, or CD player, etc.) to shuffle through stored content (whether buffered or stored in memory), signaling to server 120 to shuffle through streamed content, and so on.

In some instances, operation 350 is facilitated or controlled by circuitry 230 and/or media application 225. For example, storage 220 may include a non-transitory computer readable medium operatively coupled to circuitry 230 and storing instructions thereon that, when executed, cause circuitry 230 to change the playback position of the local primary content, including in some cases interfacing with media application 225 and/or drivers of display 240, audio component 245, and/or multimedia components 135.

At operation 355, method 300 includes re-synchronizing the local primary content with the delivered primary content. This may be done in a fashion substantially similar to the synchronization process described herein (e.g., in connection with operation 310 and/or 355), including with respect to facilitation and/or control by circuitry 230 and/or media application 225. Re-synchronization per operation 355 typically occurs in response to the playback position being changed (per operation 350). In embodiments, the delivered primary and/or the local primary content may be paused responsive to the playback position of the local primary content being changed (e.g., based on signaling between first and second electronic devices 105 and 115). Here it will be noted that some aspects of operation 330 may be applied to operations 350 through 360 regarding indications provided via second electronic device 115 when the local primary content position is changed. Operation 360 involves continuing playback of the local primary content. In this connection, playback of the local primary content may resume, which in some cases involves unpausing the local primary content, at the new playback position following or upon the re-synchronization of the local primary content and the delivered primary content.

Figure 4A:
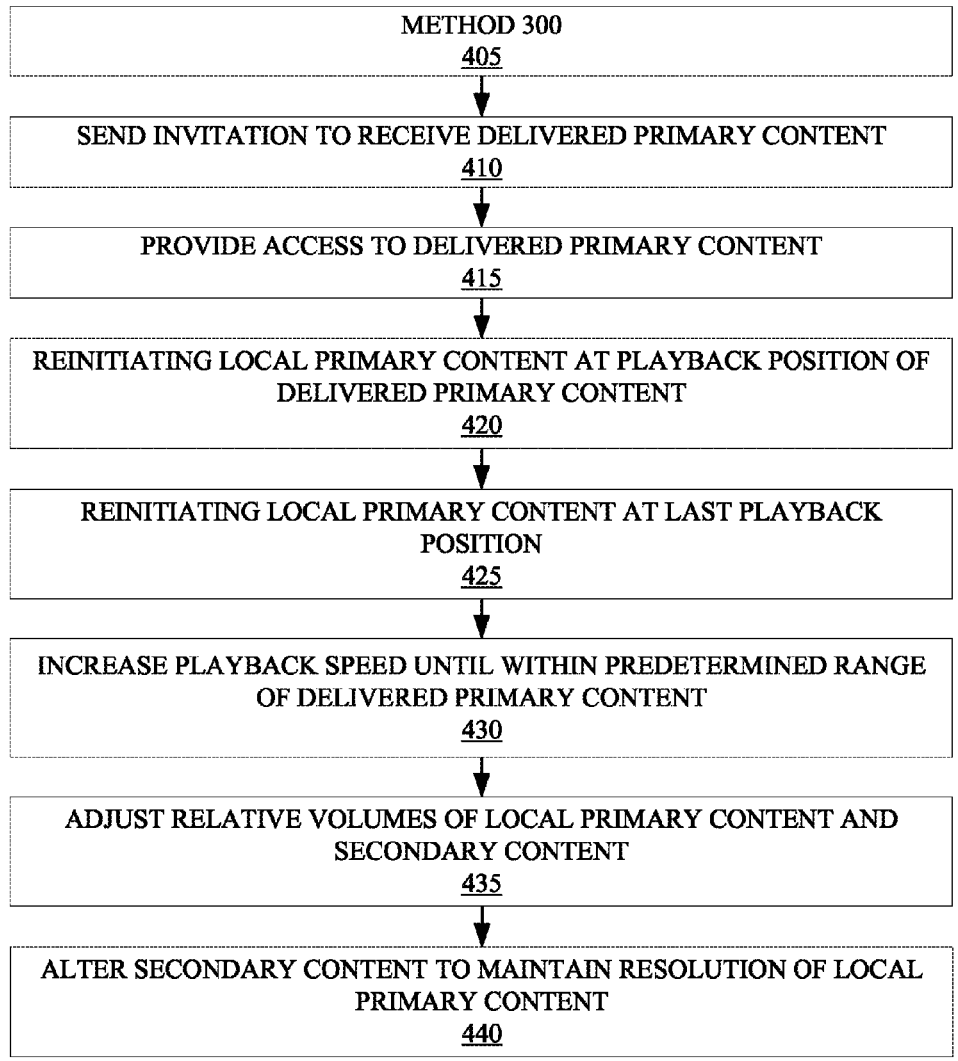
FIG. 4A is an operational flow diagram illustrating various operations that may be performed in accordance with additional embodiments of the disclosure.

Turning now to FIG. 4A, example method 400 for providing co-delivery of primary content and secondary content to a plurality of electronic devices is provided. As shown in FIG. 4, at operation 405, method 400 may include any of the operations of method 300. In general, operations 410 and 415 relate to inviting devices or users to participate in the co-delivery or co-consumption of content. By way of example, first electronic device 105 may host a session for the co-delivery of content by sending invitations to one or more second electronic devices 115. In such cases, first electronic device may act as a host device. The invitations may provide second electronic devices 115 access to primary content, which may be selected by a user of first electronic device 115. Once the invitees have accepted or denied the invitations, primary content as well as secondary content may be delivered to first and second electronic devices 105 and 115 for co-consumption (e.g., co-viewing of a movie while concurrently exchanging video chat content).

At operation 410, method 400 includes the first electronic device (e.g., first electronic device 105) sending an invitation message to the second electronic device (e.g., second electronic device 115). The invitation message may enable the second electronic device to access and/or receive the delivered primary content (e.g., delivered primary content 280). For example, the first electronic device may act as a host device and initiate a session for the co-delivery of content by sending a text message, email, notification (e.g., via social media), or other format of invitation message to one or more second electronic devices.

The invitation message may include a hyperlink that may be clicked for the second electronic devices to access a URL that provides access to the delivered primary content (e.g., via server 120 or directly from first electronic device 105). Alternatively, the recipient of the invitation message may respond thereto to indicate an interest (or not) in joining the session. In such a case, the second electronic device sends an acceptance message that may be received by the first electronic device or in some cases server 120. In response to this or another form of an acceptance message, at operation 415, method 400 involves providing the second electronic device with access to the delivered primary content. This may entail, for example, providing an encryption key by which the second electronic device can decrypt the delivered primary content, or providing an access code or secured URL by which second electronic device may access the delivered primary content.

In some cases, the host device may selectively approve acceptance messages in order for the corresponding second electronic device to receive access to the delivered primary content and/or join the session. Upon access being granted, the primary content may be delivered to the second electronic devices. In alternative embodiments, the primary content may be stored in storage 220, and thus, operations 410 and 415 may be bypassed with respect to the second electronic devices gaining access to the delivered primary content. Nevertheless, the invitation/acceptance messages may still be exchanged in order to control which devices may participate in the co-delivery session. In other cases, acceptance messages (or denial messages or timeouts) are invisible to a user of the host device but may still be used to launch playback of the primary content as well as the exchange of primary content (e.g., through messaging negotiation with the host device).

Operations 410 and/or 415 may be facilitated or controlled by circuitry 230 and/or media application 225. For example, storage 220 may include a non-transitory computer readable medium operatively coupled to circuitry 230 and storing instructions thereon that, when executed, cause circuitry 230 to send an invitation message to the second electronic device, including in some cases interfacing with connectivity interface 210 and/or storage 220. Further, storage 220 may include a non-transitory computer readable medium operatively coupled to circuitry 230 and storing instructions thereon that, when executed, cause circuitry 230 to provide the second electronic device with access to the delivered primary content, including in some cases interfacing with connectivity interface 210, server 120, and/or storage 220, depending upon where encryption keys or other security measures are generated/stored/accessed.

Operations 420 through 430 generally relate to reinitiating primary content playback, for example, following an interruption of the playback. Playback of local primary content 260 at first electronic device 105 may be interrupted for a number of reasons, and may be desired or undesired. Examples include network conditions that slow down or stop throughput of data required for the playback of local primary content 260, interruption from an incoming telephone call or other application or device functionality, interruption created by the user (e.g., locking the device), and so forth. It may thus be advantageous to provide mechanisms for dealing with such interruptions regardless of the reason for the interruption. Several techniques are provided to reinitiate playback in a way that preserves or re-establishes conditions governing the co-delivery of the secondary and primary content before the interruption occurred, including in ways that provide a robust co-delivery experience. These techniques are not necessarily exclusive. For example, an option may be presented for a user to select one technique over another based on user preferences.

Alternatively, the technique may be selected automatically based on conditions surrounding the interruption (e.g., the length or nature of the interruption).

In this connection, at operation 420, example implementations of method 400 include the first electronic device (e.g., first electronic device 105) reinitiating provision of the local primary content (e.g., local primary content 260) at a playback position of the delivered primary content (e.g., delivered primary content 280). Operation 420 may occur responsive to an interruption in the local primary content, such that, e.g., following the interruption, playback the local primary content resumes in a synchronized fashion with the delivered primary content. In this manner, after the interruption, the first electronic device essentially rejoins the co-delivery session as the session is occurring in real time. This implementation of operation 420 has the advantage of minimizing the time period during which the first electronic device is not participating in the co-delivery session.

In an alternative implementation, method 400 includes operations 425 and 430, which may in some cases be selected automatically based on the nature/characteristics of the interruption (e.g., if due to an interruption, the users misses less than a certain amount of time, such as 5 seconds, the device may automatically implement operations 425 and 430). Operation 425 involves the first electronic device reinitiating provision of the local primary content at a last playback position that occurred in the local primary content prior to the interruption. Operation 425 may occur responsive to an interruption in the local primary content, such that, e.g., following the interruption, playback the local primary content resumes. The playback, however, may not be synchronized with the delivered primary content, which may continue following the interruption in the local primary content.

In some instances, operations 420 and/or 425 is facilitated or controlled by circuitry 230 and/or media application 225. For example, storage 220 may include a non-transitory computer readable medium operatively coupled to circuitry 230 and storing instructions thereon that, when executed, cause circuitry 230 to reinitiate provision of the local primary content at a playback position of the delivered primary content, including in some cases interfacing with connectivity interface 210, second electronic devices 115, media application 225 and/or drivers of display 240, audio component 245, and/or multimedia components 135.

Operation 430 involves the first electronic device causing the local primary content to be provided at an increased playback speed until the playback position of the local primary content is synchronized with the playback of the delivered primary content (e.g., at second electronic device 115). The increased playback speed may be applied until the playback position of the local primary content is within a predetermined or dynamically determined range of a playback position of the delivered primary content. This approach has the advantage of minimizing the amount of primary/secondary content missed by a user of the first electronic device during the interruption, while also balancing against the time period during which the first electronic device is not participating in the co-delivery session. In other words, operations 425 and 430 may allow the user to play catch up following an interruption.

In some instances, operation 430 is facilitated or controlled by circuitry 230 and/or media application 225. For example, storage 220 may include a non-transitory computer readable medium operatively coupled to circuitry 230 and storing instructions thereon that, when executed, cause circuitry 230 to cause the local primary content to be provided at an increased playback speed until the playback position of the local primary content is synchronized with the playback of the delivered primary content, including in some cases interfacing with connectivity interface 210, second electronic devices 115, media application 225 and/or drivers of display 240, audio component 245, and/or multimedia components 135.

With continued reference to FIG. 4, at operation 435, method 400 may include adjusting relative volumes of the local primary content and the secondary content, while holding an output volume of the first electronic device constant. For example, local primary content 260 and secondary content 270 may each include audio aspects (in addition to video aspects in some cases). Further, because the audio aspects of each content source may be provided simultaneously, it may be beneficial for a user receiving the audio aspects to be able to balance the volume mix between the two content sources without changing to total output volume of first electronic device 105. In this manner, the user may be able to focus attention to local primary content or the secondary content.

To illustrate, local primary content 260 may include a movie having dialogue, music, sound effects, and the like. Additionally, secondary content 270 may include chat content received from one or more second electronic devices 115. The chat content may include audio content and background noise from users, chat sound effects (e.g., message notifications and the like), etc. Operation 435 provides a mechanism for diminishing the audio associated with the movie relative to the audio associated with the chat content, or vice versa. Furthermore, in embodiments, operation 435 includes balancing volumes of secondary content 270a, 270b, and/or 270c relative to one another as well as relative to local primary content 260. This may enable a user to focus on particular chat participants, for example.

Operation 435 may be performed using any combination of hardware and software. In embodiments, GUI 235 may provide (e.g., via display 240) an image resembling a slider that a user may control or interact with using gestures, where one end of the slider represents balancing the volume toward the local primary content and the other end of the slider represents balancing the volume toward the secondary content. The slider may be made multi-faceted in order for individual balancing to be effected for each element of secondary content 270a, 270b, and/or 270c. Further, the volume of the respective elements of secondary content 270a, 270b, and 270c may be controlled indirectly or automatically based on the user's interaction with secondary content 270a, 270b, and 270c. For example, the currently interacted with or most interacted elements may be increased in volume relative to the others.

Alternatively, an image resembling a knob or series of knobs may be provided by GUI 235, such that the volume may be balanced using one or more virtual knobs that may be controlled, e.g., using multi-touch or single-touch gestures. In embodiments, the volume may be balanced based on voice control commands received from a user of first electronic device 105. Typically, the overall volume of the device may be held constant during the volume balancing of operation 435 and/or may be adjusted in the normal fashion (e.g., using a volume rocker or other hard-key and/or soft-key control). In embodiments, however, dedicated hard keys for volume adjustment may be transformed to function as volume balance keys as between the local primary and secondary content upon receipt of user input corresponding to an instruction to make this transformation.

In some instances, operation 435 is facilitated or controlled by circuitry 230 and/or media application 225. For example, storage 220 may include a non-transitory computer readable medium operatively coupled to circuitry 230 and storing instructions thereon that, when executed, cause circuitry 230 to adjust relative volumes of the local primary content and the secondary content, while holding an output volume of the first electronic device constant, including in some cases interfacing with media application 225 and/or drivers of display 240, audio component 245, and/or multimedia components 135.

As further illustrated in FIG. 4A, at operation 440, method 400 may include altering the secondary content in order to maintain a resolution of the local primary content above a predetermined threshold. In some cases, the communication bandwidth of communication medium 110 dedicated to first electronic device 105 or second electronic device 115 may be limited. For example, prevailing network conditions, localized conditions, or other factors may limit the amount and/or speed of data that may be communicated to the device via communication medium 110. In such a case, the device may make tradeoffs. e.g., based on quality-of-service parameters, in order to prioritize certain data to be delivered over communication medium 110. This concept may also be applied to communications via communication medium 130.

By way of example, first electronic device 105 may determine that bandwidth is limited, and thus, not all of the primary and secondary content delivered thereto/thereby may be received or provided at a highest or current resolution or accuracy. In such a case, either the primary or secondary content may be altered (e.g., by reducing the resolution thereof) to such that the bandwidth limitation may be removed. This alteration may include reducing the video or audio resolution of secondary content 270 such that a resolution of local primary content 260 may be maintained. In some cases, the alteration may be used to maintain the delivery of content above a predetermined threshold (e.g., a resolution, throughput, or error threshold of data or content such as local primary content 260). The alteration may be designed to take effect before the predetermined threshold is crossed, or using hysteresis (e.g., a time to trigger for which the threshold is crossed).

In example deployments, first electronic device 105 determines that bandwidth with respect to communication medium 110 is limited, for example with respect to content being delivered from one or more second electronic devices 115 and/or server 120. This may be done using a combination of connectivity interface 210 (e.g., by detecting quality/strength of a radio channel), media application 225 (e.g., by determining resolution/accuracy characteristics of content and the like), and circuitry 230 (e.g., by error rate measurements), and may, for example, be accomplished using techniques such as adaptive bitrate streaming. Based on this determination, first electronic device 105 decreases the resolution of secondary content 270a, 270b, and/or 270c in order to maintain the resolution of primary content above a predetermined or dynamically generated threshold. The threshold may be determined using one or more quality-of-service parameters. Thus, for example, the quality and/or accuracy of a movie of other video programming being viewed may be preserved (and if necessary at the expense of the quality/accuracy of video chat content).

In other example implementations, secondary content 270a, 270b, 270c may be further limited to meet system preferences. In some cases, where secondary content 270 includes video chat content, the video aspect of the content may not be transmitted (e.g., first electronic device 105 may signal second electronic device 115 to cease transmission of the video aspect), and may replace the video aspect of the content with an image (e.g., an avatar of the user), thus conserving and/or reallocating bandwidth. Alternatively, first electronic device may receive but ignore (or not display) the video aspect of the content. Additional alterations are possible, e.g., as may be applied to communication medium 130, multimedia components 135, audio content, and content (e.g., delivered primary content 280 being displayed on secondary electronic devices 115). As one example, the alteration may include shutting off the gathering/transmission of secondary content 270 by first electronic device 105 if it is determined that battery life is low. This type of alteration, as well the examples described above, may be applied to conserve battery life.

In some instances, operation 440 is facilitated or controlled by circuitry 230 and/or media application 225. For example, storage 220 may include a non-transitory computer readable medium operatively coupled to circuitry 230 and storing instructions thereon that, when executed, cause circuitry 230 to alter the secondary content in order to maintain a resolution of the local primary content above a predetermined threshold, including in some cases interfacing with connectivity interface 210, storage 220, media application 225 and/or drivers of display 240, audio component 245, and/or multimedia components 135.

Figure 4B:
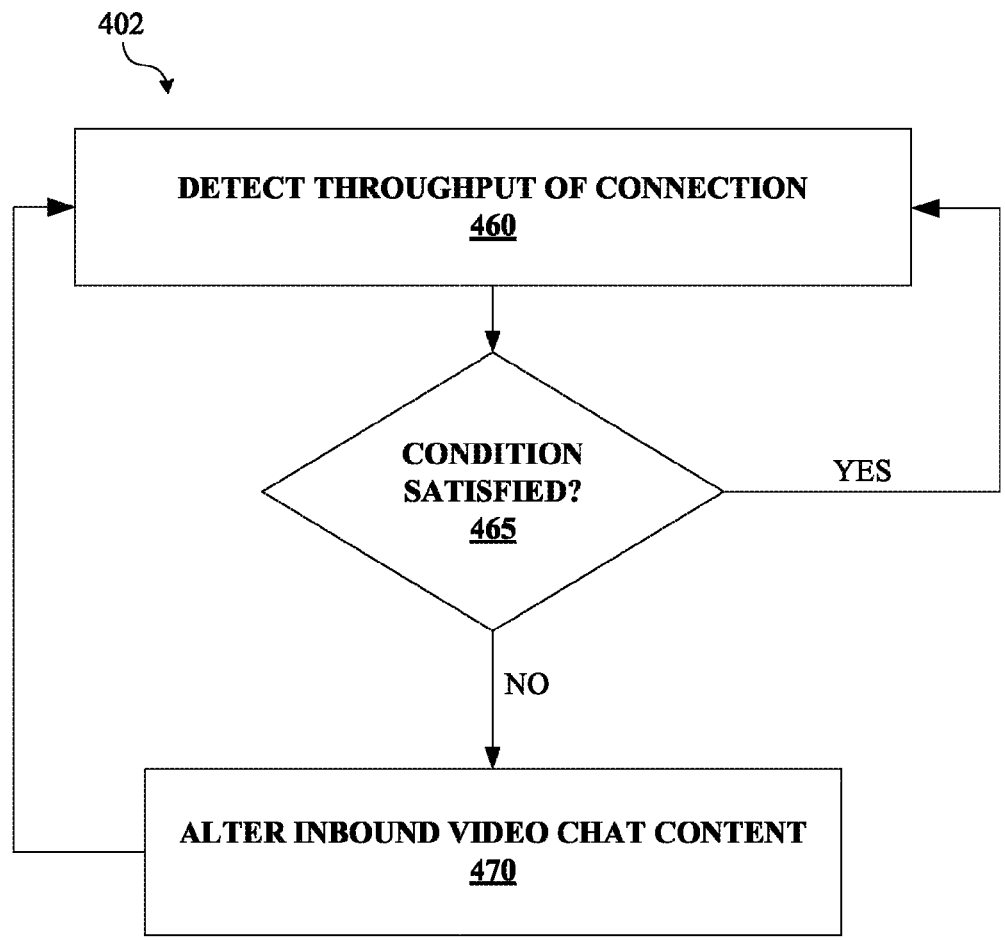
FIG. 4B is an operational flow diagram illustrating various operations that may be performed in accordance with additional embodiments of the disclosure.

FIG. 4B illustrates method 402, the principles of which may be used to alter the primary or secondary content in order to satisfy a condition, such as a quality-of-service parameter. Some principles of method 402 are described above in connection with operation 440. In the specific example shown in FIG. 4B, method 402 includes operation 460 for detecting a throughput of a connection (e.g., a connection between first and second electronic devices 105 and 115 established via communication medium 110). At operation 465, method 402 involves determining whether a condition is satisfied. If the condition is satisfied, operation 460 is repeated. If, however, the condition is not satisfied, method 402 proceeds to operation 470, which involves altering inbound video chat content 470 (which. e.g., may be an aspect of secondary content 270). Following operation 470, method 402 optionally repeats operation 460 in a looping fashion to provide for ongoing monitoring of whether the condition is satisfied.

Method 402 may be facilitated or controlled by circuitry 230 and/or media application 225. For example, storage 220 may include a non-transitory computer readable medium operatively coupled to circuitry 230 and storing instructions thereon that, when executed, cause circuitry 230 to perform any of operations 460, 465, and 470, including in some cases interfacing with connectivity interface 210, media application 225, drivers of display 240, audio component 245, multimedia components 135, a battery, and the like.

Many variations to method 402 will be recognized upon studying the present disclosure. For example, operation 460 may be modified such that, instead of detecting throughput, various other detections may be made, such as, e.g., battery power remaining or projected battery life, playback resolution of the primary or secondary content, error rate of the primary or secondary content, bandwidth available to a particular electronic device, prevailing or local network conditions, type or nature of the primary or secondary content, and so one. Additionally, with respect to operation 465, various conditions may be used, such as, e.g., quality-of-service parameters related to playback of primary/secondary content, data or memory usage, projected talk time, battery life, and so on. The condition may be predetermined, configurable (e.g., by the user, application developer, network operator, etc.), dynamically determined or configured, etc. With respect operation 470, various alterations may be substituted or added for/to those made to inbound video chat content. For example, the primary or secondary content may be altered in a variety of ways (e.g., as described in connection with operation 440). At this juncture, it should also be mentioned that operations 440 and/or 460 through 470 may restore the content to its state prior to alteration once the reasons for the conditions precipitating the alteration have subsided.

Figure 5A:
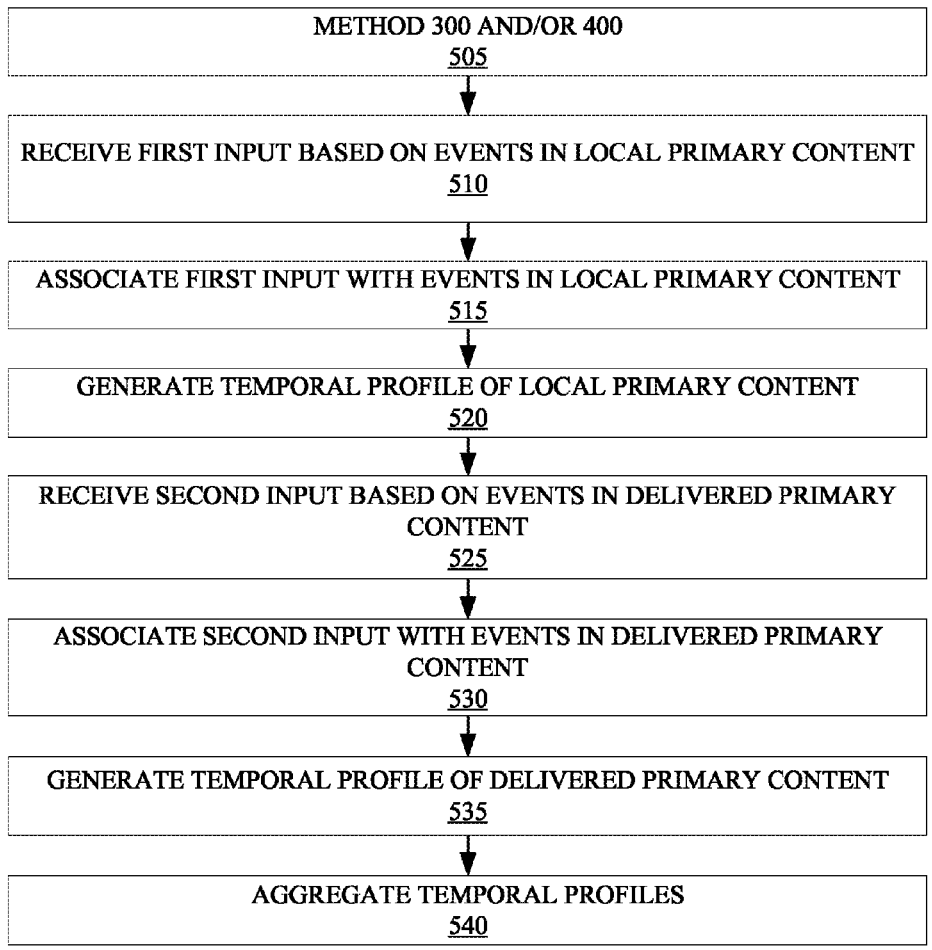
FIG. 5A is an operational flow diagram illustrating various operations that may be performed in accordance with additional embodiments of the disclosure.

FIG. 5A is an operational flow diagram illustrating various operations that may be performed in accordance with embodiments of the disclosure and in connection with method 500 for providing co-delivery of primary and secondary content. The operations of method 500 relate more specifically to collecting and analyzing user feedback provided via the secondary content in response to the primary content. Users may provide feedback via respective electronic devices, and the feedback may be mapped temporally to the primary content in order to create a temporal profile of the primary content. Such a temporal profile may contain various metadata and may be used for analytic purposes, including marketing, content direction or design, and so on. Furthermore, such a temporal profile may provide much more granular user feedback than more traditional "like" or "dislike" user input, while still be more easily analyzed and actionable than full text responses such as those contained in user input that takes the form of commentary.

At operation 505, method 500 may include any of the operations of method 300 or method 400. At operation 510, method 500 may include receiving first input based on one or more events occurring in the primary content. For example, first electronic device 105 may display (e.g., via display 240) a video aspect of local primary content 260 to a user. In response to events included in local primary content 260, the user may provide input (e.g., text, gestures, emoticons, sound or video captures, etc.) to first electronic device 105. In some instances, operation 510 is facilitated or controlled by circuitry 230 and/or media application 225. For example, storage 220 may include a non-transitory computer readable medium operatively coupled to circuitry 230 and storing instructions thereon that, when executed, cause circuitry 230 to receive first input based on one or more events occurring in the primary content, including in some cases interfacing with media application 225 and/or drivers of display 240, audio component 245, and/or multimedia components 135.

At operation 515, method 500 may include associating the first input with the events. In this regard, an event may be tagged or otherwise linked with metadata generated based on the received input and/or surrounding environmental conditions, including, e.g., the nature and content of the input, the time the input was entered, user characteristics, characteristics of the co-delivery session (e.g., the nature or characteristics of the primary content, participants in the session, the nature or characteristics of the secondary content, local data related to the device, etc.), and so forth. In some instances, operation 515 is facilitated or controlled by circuitry 230 and/or media application 225. For example, storage 220 may include a non-transitory computer readable medium operatively coupled to circuitry 230 and storing instructions thereon that, when executed, cause circuitry 230 to associate the first input with the events, including in some cases interfacing with media application 225, connectivity interface 210, and/or server 120.

Operation 515 or aspects thereof may be carried out locally on first electronic device 105, e.g., using at least media app 225 and/or circuitry 230. Alternatively, operation 515 or aspects thereof may be carried out remotely on another device (e.g., second electronic device 115 or computing devices included in multimedia components 135) or using a combination of server 120, processor 140, and/or storage 125. For example, the user input captured at operation 510 may be processed and transmitted to a remote device or server via communication medium 110 or 130. The above-described tagging may then occur offline and remotely from first electronic device 105.

At operation 520, method 500 may involve generating a temporal profile of the local primary content. The temporal profile of the local primary content is derived from the user input for a set of the events. By way of example, the temporal profile of the local primary content may indicate at what points in the local primary content the user provides input, as well as the nature of the user input. The temporal profile, in some cases, provide a plot of the user's sentiment with respect to the local primary content over time. In one example implementation where in the local primary content is a movie or other program, the temporal profile may be used to map the user's happy, sad, or romantic reactions to correspondingly themed portions of the movie or program. In this example, receiving input in the form of emoticons may be particularly useful.

In some instances, operation 520 is facilitated or controlled by circuitry 230 and/or media application 225. For example, storage 220 may include a non-transitory computer readable medium operatively coupled to circuitry 230 and storing instructions thereon that, when executed, cause circuitry 230 to generate a temporal profile of the local primary content, including in some cases interfacing with media application 225, connectivity interface 210, and/or server 120, and including to derive metrics (at times by performing mathematical-related operations) from the user input.

Figure 5B:
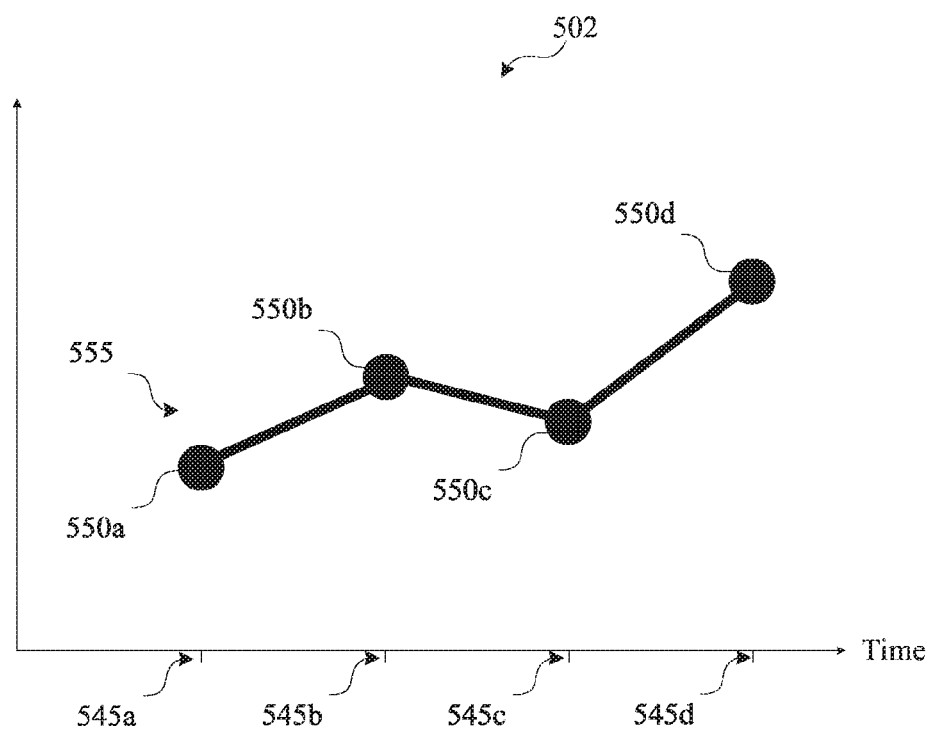
FIG. 5B illustrates an example conceptual format for a temporal profile that may be generated in accordance with embodiments of the disclosure.

FIG. 5B illustrates an example conceptual format 502 for temporal profile 555 that may be generated in accordance with the embodiments above described by way of illustration in connection with operations 510 through 520. Temporal profile 555 is plotted against events 545a through 545d, which may be included in the primary local content, for example. Events 545a through 545d may represent a subset of the events of the primary local content—additional events may reside between events 545a through 545d or may reside further behind or ahead therefrom along the time axis shown in FIG. 5B.

Temporal profile points 550a through 550d correspond along the time access to events 545a through 545d. Temporal profile points 550a through 550d may be given values in the vertical access (i.e., perpendicular to the time access) based on the user input or metrics derived therefrom, including, as described above based on metadata associated with events 545a through 545d. One example of values that may be used along the vertical access for profiling purposes is user sentiment (e.g., as captured by emoticons). The vertical access may represent other characteristics and/or calculated results based on the metadata and/or user input. For example, input received for the primary content by first electronic device may be accumulatively plotted in temporal profile 555, such that, e.g., all of a user's various reactions across multiple viewings of the primary content may be captured. In embodiments, additional axes may be added to conceptual format 502, such that, for example, profile 555 may be three- or multi-dimensional in nature. Conceptual format 502 is not limited to the specific format shown by way of example in FIG. 5B, but may take any other format, e.g., tabular, bar or other type of graph, and so on.

Returning now to FIG. 5A, operations 525 through 535 will now be described. In some cases, operations 525 through 535 largely resemble operations 510 through 520, except that operations 525 through 535 relate to using input received via second electronic devices (e.g., second electronic device 115) to generate a second temporal profile based on delivered primary content. At operation 525, method 500 may include the second electronic device receiving second input based on one or more events included in delivered primary content (e.g., delivered primary content 280). At operation 530, method 500 includes associating the second input with one or more of the events. At operation 535, method 500 includes generating a temporal profile of the delivered primary content. The temporal profile of the delivered primary content is derived from the second input for a set of the events. As mentioned, aspects of the above variations and description of operations 510 through 520 may apply to operations 525 through 535, as may aspects of the above descriptions set forth in connection with FIG. 5B.

At operation 540, method 500 includes aggregating the temporal profile of the local primary content (generated per operation 520) with the temporal profile of the delivered primary content (generated per operation 535). Operation 540 allows for larger scale analysis of user response and feedback to primary content. The aggregated profile may resemble temporal profile 555 in nature, and the description set forth above in connection with FIG. 5B may be applied to the aggregated profile on an aggregated basis. Operation 540 may also be used to facilitate a comparative analysis of profiles generated from different pools of users, profiles generated based on different groupings of primary content, and profiles generated based on other data points. Thus, the aggregated profile may be run through analytics to provide insight into content penetration and reception, marketing efficiency, user characteristics, and the like.

In embodiments herein, operation 540 is facilitated or controlled by circuitry 230 and/or media application 225. For example, storage 220 may include a non-transitory computer readable medium operatively coupled to circuitry 230 and storing instructions thereon that, when executed, cause circuitry 230 to aggregate the temporal profile of the local primary content with the temporal profile of the delivered primary content, including in some cases interfacing with media application 225, storage 220, connectivity interface 210, and/or server 120, and at times by performing mathematical-related operations.

Figure 6:
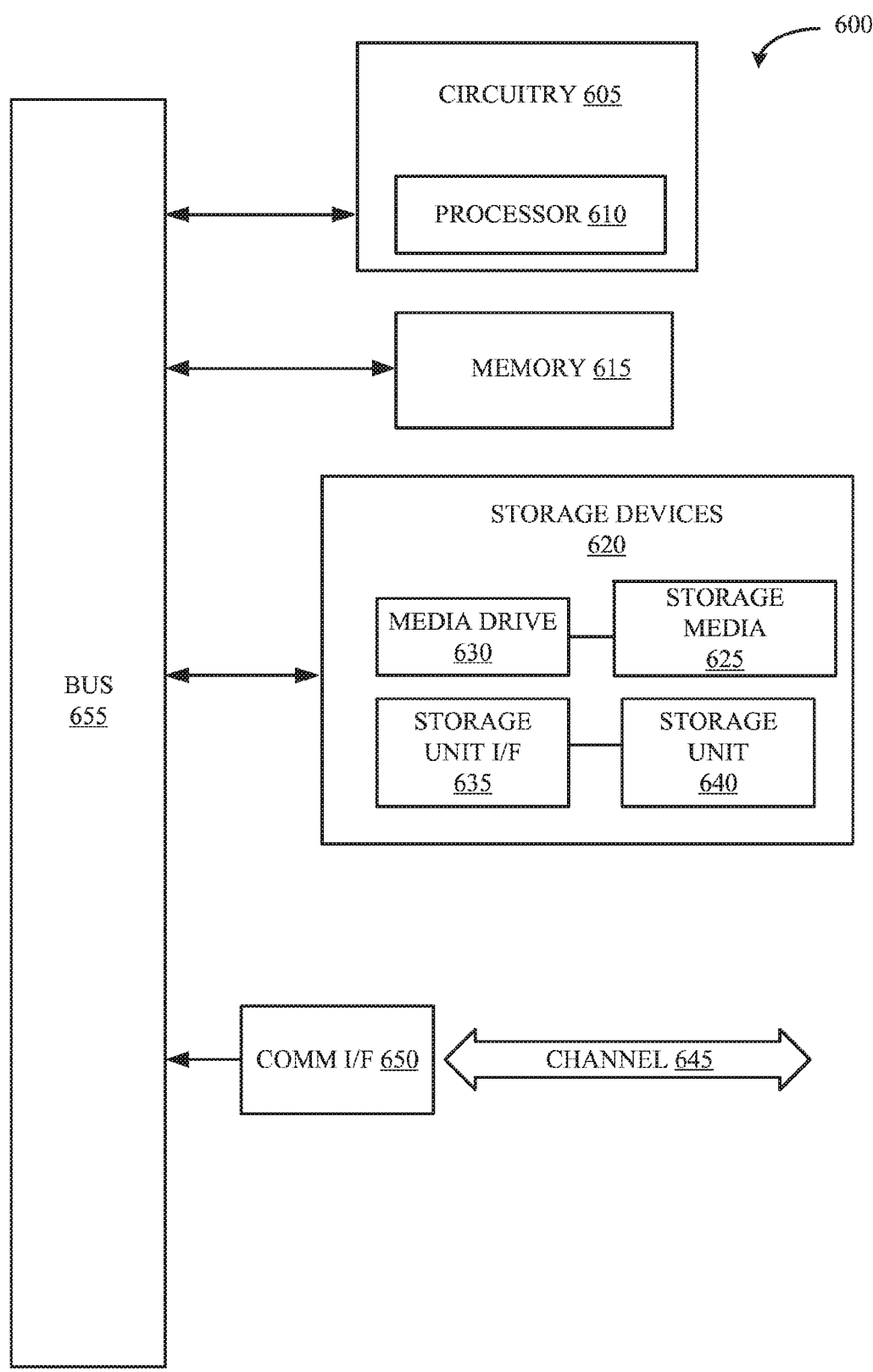
FIG. 6 illustrates an example computing module that may be used to implement features of various embodiments of the disclosure.

FIG. 6 illustrates example computing module 600, which may in some instances include a processor/controller resident on a computer system (e.g., server 120 or first or second electronic device 105 or 115). Computing module 600 may be used to implement various features and/or functionality of embodiments of the systems, devices, and methods disclosed herein. With regard to the above-described embodiments set forth herein in the context of systems, devices, and methods described with reference to FIGS. 1 through 6, including embodiments involving server 120, first electronic device 105, and/or second electronic device 115, one of skill in the art will appreciate additional variations and details regarding the functionality of these embodiments that may be carried out by computing module 600. In this connection, it will also be appreciated by one of skill in the art that features and aspects of the various embodiments (e.g., systems) described herein may be implemented with respected to other embodiments (e.g., methods) described herein without departing from the spirit of the disclosure.

As used herein, the term module may describe a given unit of functionality that may be performed in accordance with one or more embodiments of the present application. As used herein, a module may be implemented utilizing any form of hardware, software, or a combination thereof. For example, one or more processors, controllers, ASICs, PLAs. PALs, CPLDs, FPGAs, logical components, software routines or other mechanisms may be implemented to make up a module. In implementation, the various modules described herein may be implemented as discrete modules or the functions and features described may be shared in part or in total among one or more modules. In other words, as would be apparent to one of ordinary skill in the art after reading this description, the various features and functionality described herein may be implemented in any given application and may be implemented in one or more separate or shared modules in various combinations and permutations. Even though various features or elements of functionality may be individually described or claimed as separate modules, one of ordinary skill in the art will understand that these features and functionality may be shared among one or more common software and hardware elements, and such description shall not require or imply that separate hardware or software components are used to implement such features or functionality.

Where components or modules of the application are implemented in whole or in part using software, in one embodiment, these software elements may be implemented to operate with a computing or processing module capable of carrying out the functionality described with respect thereto. One such example computing module is shown in FIG. 6. Various embodiments are described in terms of example computing module 600. After reading this description, it will become apparent to a person skilled in the relevant art how to implement the application using other computing modules or architectures.

Referring now to FIG. 6, computing module 600 may represent, for example, computing or processing capabilities found within mainframes, supercomputers, workstations or servers; desktop, laptop, notebook, or tablet computers: hand-held computing devices (tablets, PDA's, smartphones, cell phones, palmtops, etc.); or the like, depending on the application and/or environment for which computing module 600 is specifically purposed.

Computing module 600 may include, for example, one or more processors, controllers, control modules, or other processing devices, such as a processor 610, and such as may be included in circuitry 605. Processor 610 may be implemented using a special-purpose processing engine such as, for example, a microprocessor, controller, or other control logic. In the illustrated example, processor 610 is connected to bus 655 by way of circuitry 605, although any communication medium may be used to facilitate interaction with other components of computing module 600 or to communicate externally.

Computing module 600 may also include one or more memory modules, simply referred to herein as main memory 615. For example, random access memory (RAM) or other dynamic memory may be used for storing information and instructions to be executed by processor 610 or circuitry 605. Main memory 615 may also be used for storing temporary variables or other intermediate information during execution of instructions to be executed by processor 610 or circuitry 605. Computing module 600 may likewise include a read only memory (ROM) or other static storage device coupled to bus 655 for storing static information and instructions for processor 610 or circuitry 605.

Computing module 600 may also include one or more various forms of information storage devices 620, which may include, for example, media drive 630 and storage unit interface 635. Media drive 630 may include a drive or other mechanism to support fixed or removable storage media 625. For example, a hard disk drive, a floppy disk drive, a magnetic tape drive, an optical disk drive, a CD or DVD drive (R or RW), or other removable or fixed media drive may be provided. Accordingly, removable storage media 625 may include, for example, a hard disk, a floppy disk, magnetic tape, cartridge, optical disk, a CD or DVD, or other fixed or removable medium that is read by, written to or accessed by media drive 630. As these examples illustrate, removable storage media 625 may include a computer usable storage medium having stored therein computer software or data.

In alternative embodiments, information storage devices 620 may include other similar instrumentalities for allowing computer programs or other instructions or data to be loaded into computing module 600. Such instrumentalities may include, for example, fixed or removable storage unit 640 and storage unit interface 635. Examples of such removable storage units 640 and storage unit interfaces 635 may include a program cartridge and cartridge interface, a removable memory (for example, a flash memory or other removable memory module) and memory slot, a PCMCIA slot and card, and other fixed or removable storage units 640 and storage unit interfaces 635 that allow software and data to be transferred from removable storage unit 640 to computing module 600.

Computing module 600 may also include a communications interface 650. Communications interface 650 may be used to allow software and data to be transferred between computing module 600 and external devices. Examples of communications interface 650 include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 650 may typically be carried on signals, which may be electronic, electromagnetic (which includes optical) or other signals capable of being exchanged by a given communications interface 650. These signals may be provided to/from communications interface 650 via channel 645. Channel 645 may carry signals and may be implemented using a wired or wireless communication medium. Some non-limiting examples of channel 645 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 615, storage unit interface 635, removable storage media 625, and channel 645. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing module 600 or a processor to perform features or functions of the present application as discussed herein.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed in multiple groupings or packages or across multiple locations.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A first electronic device for providing primary content and secondary content, the first electronic device comprising:

a transceiver that receives the secondary content from a second electronic device, wherein the secondary content comprises a live video stream captured by the second electronic device;

a display and an audio component, each capable of outputting aspects of the primary content and the secondary content, wherein the primary content comprises a video program;

circuitry coupled to the transceiver, the display, and the audio component; and a non-transitory computer-readable medium operatively coupled to the circuitry and storing instructions that, when executed, cause the circuitry to:

synchronize local primary content with delivered primary content, wherein the local primary content comprises a version of the video program to be provided by the first electronic device to a first user, and wherein the delivered primary content comprises a version of the video program to be provided by the second electronic device to a second user; and signal one or more of the display and the audio component to output aspects of the local primary content and the secondary content.

2. The system of claim 1, wherein the display is a touch-sensitive display, and wherein the non-transitory computer-readable medium further stores instructions that, when executed, cause the circuitry to:

responsive to user input received via the touch-sensitive display, change a playback position of the local primary content;

pause the local primary content;

responsive to the playback position of the local primary content being changed, re-synchronize the local primary content with the delivered primary content by signaling the second electronic device to change a playback position of the delivered primary content; and unpause the local primary content.

3. The system of claim 1, wherein the non-transitory computer-readable medium further stores instructions that, when executed, cause the circuitry to, responsive to an interruption in the local primary content, signal the display and the audio component to output the aspects of the local primary content at a playback position of the delivered primary content.

4. The system of claim 1, wherein the non-transitory computer-readable medium further stores instructions that, when executed, cause the circuitry to:

signal the display to output a video aspect of the local primary content in a first region of the display and a video aspect of the secondary content in a second region of the display; and signal the audio component to output an audio aspect of the local primary content and an audio aspect of the secondary content.

5. A method for providing co-delivery of primary content and secondary content to a plurality of electronic devices, the method comprising:

a first electronic device providing the local primary content to a first user, wherein the primary content comprises a video program, wherein the local primary content comprises a version of the video program provided by the first electronic device to a first user;

the first electronic device receiving the secondary content from a second electronic device, wherein the secondary content comprises a live video stream captured by the second electronic device;

the first electronic device providing the received secondary content to the first user; and synchronizing, at the first electronic device, the local primary content with delivered primary content, wherein the delivered primary content comprises a version of the video program provided by the second electronic device to a second user.

6. The method of claim 5, further comprising:

during a time period, altering a playback speed of the local primary content;

after the time period, pausing playback of the local primary content; and re-synchronizing the local primary content with the delivered primary content.

7. The method of claim 6, further comprising:

responsive to the playback speed of the local primary content being altered, the first electronic device sending a signal to the second electronic device to indicate playback of the delivered primary content should be paused; and responsive to the local primary content being re-synchronized with the delivered primary content, the first electronic device sending a signal to the second electronic device to indicate the playback of the delivered primary content should be unpaused, and unpausing the playback of the local primary content.

8. The method of claim 5, further comprising:

changing a playback position of the local primary content;

responsive to the playback position being changed, re-synchronizing the local primary content with the delivered primary content by signaling the second electronic device to change a playback position of the delivered primary content; and responsive to the local primary content being re-synchronized with the delivered primary content, continuing playback of the local primary content.

9. The method of claim 5, further comprising: responsive to an interruption in the local primary content, the first electronic device reinitiating provision of the local primary content at a playback position of the delivered primary content.

10. The method of claim 5, further comprising:

responsive to an interruption in the local primary content, the first electronic device reinitiating provision of the local primary content at a last playback position that occurred in the local primary content prior to the interruption; and the first electronic device causing the local primary content to be provided at an increased playback speed until a playback position of the local primary content is within a predetermined range of a playback position of the delivered primary content.

11. The method of claim 5, further comprising adjusting relative volumes of the local primary content and the secondary content, while holding an output volume of the first electronic device constant.

12. The method of claim 5, further comprising altering the secondary content in order to maintain a resolution of the local primary content above a predetermined threshold.

13. The method of claim 5, further comprising:

the first electronic device sending an invitation message to the second electronic device to enable the second electronic device to receive the delivered primary content; and responsive to the first electronic device receiving an acceptance message from the second electronic device, providing the second electronic device with access to the delivered primary.

14. The method of claim 5, wherein the local primary content comprises one or more events, the method further comprising:
the first electronic device receiving first input based on at least one of the one or more events;
associating the first input with the at least one of the one or more events;
generating a temporal profile of the local primary content, wherein the temporal profile of the local primary content is derived from the first input for a set of the one or more events.

15. The method of claim 14, wherein the delivered primary content comprises at least one of the one or more events, the method further comprising:
the second electronic device receiving second input based on the at least one of the one or more events;
associating the second input with the at least one of the one or more events;
generating a temporal profile of the delivered primary content, wherein the temporal profile of the delivered primary content is derived from the second input for a set of the one or more events; and
aggregating the temporal profile of the local primary content with the temporal profile of the delivered primary content.

16. A system for co-delivery of pre-recorded video programming content and streaming video chat content, the streaming video chat content comprising inbound video chat content and outbound video chat content, the system comprising:
a host device that provides a plurality of electronic devices with access to the pre-recorded video programming content, the host device comprising a transceiver that receives the inbound video chat content from at least one of the plurality of electronic devices and transmits the outbound video chat content to the at least one of the plurality of electronic devices;
multimedia components capable of outputting aspects of the pre-recorded video programming content and the streaming video chat content;
circuitry coupled to the transceiver and the multimedia components;
a non-transitory computer-readable medium operatively coupled to the circuitry and storing instructions that, when executed, cause the circuitry to:
initiate, via the transceiver of the host device sending a message to at least one of the plurality of electronic devices, a session for the co-delivery of the pre-recorded video programming content and streaming video chat content;
synchronize the pre-recorded video programming content across the host device and the at least one of the plurality of electronic devices; and
signal the multimedia components to concurrently output the pre-recorded video programming content and the inbound video chat content.

17. The system of claim 16, wherein the multimedia components comprise a touch-sensitive display of the host device; and wherein the non-transitory computer-readable medium further stores instructions that, when executed, cause the circuitry to, responsive to input received via the touch-sensitive display, adjust relative volumes of the pre-recorded video programming content and the video chat content, while holding a total output volume constant.

18. The system of claim 16, wherein the non-transitory computer-readable medium further stores instructions that, when executed, cause the circuitry to:
make a determination of whether throughput of a connection of the host device satisfies a condition; and
if the determination indicates that the throughput does not satisfy the condition, alter the inbound video chat content, such that a quality of service of the pre-recorded video programming content is maintained.

19. The system of claim 16, wherein the pre-recorded video programming content comprises one or more events; wherein the video chat content comprises event-based input provided in response to at least one of the one or more events; and wherein the system further comprises:
a server that receives the event-based input from one or more of the host device and the at least one of the plurality of electronic devices; and
a processor that associates the event-based input with the at least of the one or more events, and generates a temporal profile of the pre-recorded video programming content, the temporal profile comprising the event-based input for a set of the one or more events.

* * * * *

UNITED STATES PATENT AND TRADEMARK OFFICE
CERTIFICATE OF CORRECTION

| | | |
|---|---|---|
| PATENT NO. | : 9,813,667 B1 | Page 1 of 1 |
| APPLICATION NO. | : 15/134249 | |
| DATED | : November 7, 2017 | |
| INVENTOR(S) | : Mehul Patel and Christopher S. Taylor | |

It is certified that error appears in the above-identified patent and that said Letters Patent is hereby corrected as shown below:

In the Specification

Column 6, Line 56: "microwavc/RF" should be -- microvave/RF --.

In the Claims

Column 31, Line 25: "The system of" should be -- The first electronic device --.

Column 31, Line 39: "The system of" should be -- The first electronic device --.

Column 31, Line 42: "signal the display" should be -- signal one or more of the display --.

Column 31, Line 46: "The system of" should be -- The first electronic device --.

Column 31, Line 59: "providing the local" should be -- providing local --.

Column 34, Line 42: "at least of" should be -- at least one of --.

Signed and Sealed this
Twenty-seventh Day of March, 2018

Andrei Iancu
*Director of the United States Patent and Trademark Office*